United States Patent
Goyal et al.

(10) Patent No.: US 11,452,005 B2
(45) Date of Patent: Sep. 20, 2022

(54) SYSTEM AND METHOD FOR CONSTRUCTION OF A PROTOCOL DATA UNIT USING SELECTIVE RELAY

(71) Applicant: QUALCOMM Incorporated, San Diego, CA (US)

(72) Inventors: Giriraj Goyal, Bangalore (IN); Vishal Agarwal, Ramnagar (IN); Nitin Raghavendra Kidiyoor, Bangalore (IN)

(73) Assignee: QUALCOMM INCORPORATED, San Diego, CA (US)

(*) Notice: Subject to any disclaimer, the term of this patent is extended or adjusted under 35 U.S.C. 154(b) by 22 days.

(21) Appl. No.: 16/843,521

(22) Filed: Apr. 8, 2020

(65) Prior Publication Data

US 2020/0329400 A1    Oct. 15, 2020

(30) Foreign Application Priority Data

Apr. 12, 2019 (IN) .............................. 201941014808

(51) Int. Cl.
| | |
|---|---|
| *H04W 28/06* | (2009.01) |
| *H04L 69/166* | (2022.01) |
| *H04L 1/16* | (2006.01) |
| *H04L 1/18* | (2006.01) |
| *H04L 69/322* | (2022.01) |
| *H04W 80/02* | (2009.01) |

(52) U.S. Cl.
CPC .......... *H04W 28/06* (2013.01); *H04L 1/1614* (2013.01); *H04L 1/1809* (2013.01); *H04L 69/166* (2013.01); *H04L 69/322* (2013.01); *H04W 80/02* (2013.01)

(58) Field of Classification Search
CPC ... H04L 1/1614; H04L 1/1809; H04L 43/065; H04L 43/0835; H04L 69/166; H04W 4/80; H04W 24/02; H04W 28/06
USPC ................ 370/310, 328, 338; 455/41.1, 41.2
See application file for complete search history.

(56) References Cited

U.S. PATENT DOCUMENTS

| | | |
|---|---|---|
| 10,341,758 B1 * | 7/2019 | Tong ........................ H04W 4/80 |
| 2009/0217119 A1 | 8/2009 | Zhang et al. |
| 2011/0059696 A1 | 3/2011 | Rasmussen et al. |
| 2019/0104424 A1 * | 4/2019 | Hariharan ............. H04W 24/02 |
| 2019/0349682 A1 * | 11/2019 | Hsu ........................ H04L 43/065 |

OTHER PUBLICATIONS

International Search Report and Written Opinion—PCT/US2020/027483—ISA/EPO—dated Jul. 1, 2020.

* cited by examiner

*Primary Examiner* — Harun Chowdhury
(74) *Attorney, Agent, or Firm* — Arent Fox, LLP

(57) ABSTRACT

An apparatus may receive, from a second device over a first communications link, a first bitmap indicating a first set of packets received by the second device from a third device; determine a second bitmap indicating a second set of packets received by the first device from the third device, each of the first set of packets and the second set of packets comprising at least a fragment of a PDU; transmit, to the second device, information indicating a third set of packets based on the first bitmap and based on the second bitmap, the third set of packets being unsuccessfully received by the first device from the third device; and receive a fourth set of packets from the second device based on transmission of the information indicating the third set of packets, the fourth set of packets including information from the third set of packets.

26 Claims, 24 Drawing Sheets

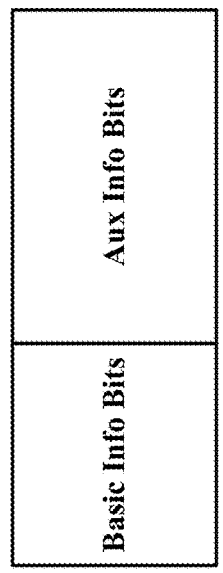
FIG. 12

SYSTEM AND METHOD FOR CONSTRUCTION OF A PROTOCOL DATA UNIT USING SELECTIVE RELAY

CROSS REFERENCE TO RELATED APPLICATION(S)

This application claims the benefit of Indian Patent Application No. 201941014808 entitled "SYSTEM AND METHOD FOR CONSTRUCTION OF A PROTOCOL DATA UNIT USING SELECTIVE RELAY" and filed on Apr. 12, 2019, which is expressly incorporated by reference herein in its entirety.

TECHNICAL FIELD

The present disclosure relates generally to communication systems, and more particularly, to constructing a protocol data unit using selective relay.

DESCRIPTION OF THE RELATED TECHNOLOGY

A wireless personal area network (WPAN) is a personal, short-range wireless network for interconnecting devices centered around a specific distance from a user. WPANs have gained popularity because of the flexibility and convenience in connectivity that WPANs provide. WPANs, such as those based on short-range wireless communications protocols, provide wireless connectivity to devices by providing wireless links that allow connectivity within a specific distance, such as 5 meters, 10 meter, 20 meters, 100 meters, etc.

Short-range wireless communications protocols may include the Bluetooth® (BT) protocol, the Bluetooth® Low Energy (BLE) protocol, the Zigbee® protocol, and so forth. BT is a wireless technology standard that enables radio frequency communication with ultra-high frequency (UHF) radio waves in the globally accepted Industrial, Scientific & Medical (ISM) band, such as from 2.400 gigahertz (GHz) to 2.485 GHz. Similarly, BLE defines a standard that enables radio frequency communication operating within the 2.4 GHz ISM band.

A short-range wireless communications protocol may be used to connect devices over a WPAN. Examples of devices that may communicate over a WPAN may include laptop computers, tablet computers, smart phones, personal data assistants, audio systems such as headsets, headphones, speakers, etc., wearable devices such as smart watches, fitness trackers, etc., battery-operated sensors and actuators in various medical, industrial, consumer, and fitness applications, and so forth.

In some scenarios, WPANs may offer advantages and conveniences over other network types, such as a wireless local area network (WLAN). However, short-range wireless communications in a WPAN may be susceptible to the same or similar issues as communication in other wireless networks. For example, short-range wireless communications may experience errors due to noisy and/or congested transmission mediums. Such issues experienced with short-range wireless communications may degrade the performance of devices, may degrade a user experience, and so forth. Thus, a need exists for an approach for addressing one or more missed packets in short-range wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various standards and protocols for use with a wireless personal area network (WPAN), such as the Bluetooth® (BT) and/or Bluetooth® Low Energy (BLE), may provide for decoding and/or decryption techniques, for example, in order to ensure packet integrity, recover from missed packets, and so forth. For example, at least a portion of a packet, such as the payload of the packet, may be protected with a cyclic redundancy check (CRC) value that must match a value calculated by a receiving device in order for the packet to be successfully decoded. If the packet is encrypted, at least a portion of the packet, such as the payload, may be protected with a packet integrity code (MIC). Similar to CRC validation, a MIC must match a value calculated by the receiving device in order for the packet to be successfully decrypted. If the CRC validation and/or the MIC validation fails at the receiving device, then the packet may be invalid.

Potentially, a receiving device may implement a feedback or other mechanism so that packets that fail CRC and/or MIC validation may be retransmitted to the receiving device. However, some receiving devices may include two receivers, such as a wireless headset with two earpieces. For such devices, the primary receiver (e.g., primary earpiece) may implement the feedback or other mechanism in order to recover lost or invalid packets, whereas the secondary receiver (e.g., secondary earpiece) may rely on "sniffing" packets intended for the primary receiver and, therefore, may lack a mechanism to recover lost packets. Moreover, the primary and secondary receivers may become unaligned, for example, when the secondary receiver misses or invalidates a packet that is successfully received by the primary receiver. Therefore, a need exists for recovering lost or invalid packets at a receiving device, for example, in order to maintain alignment between receivers of the receiving device.

In a first aspect of the disclosure, a method, a computer-readable medium, and an apparatus are provided. The apparatus may be configured to receive, from a second device over a first communications link, a first bitmap indicating a first set of packets received by the second device from a third device over a second communications link; determine a second bitmap indicating a second set of packets received by the first device from the third device, each of the first set of packets and the second set of packets comprising at least a fragment of a protocol data unit (PDU); transmit, to the second device over the first communications link, information indicating a third set of packets based on the first bitmap and based on the second bitmap, the third set of packets being unsuccessfully received by the first device from the third device; and receive a fourth set of packets from the second device over the first communications link based on transmission of the information indicating the third set of packets, the fourth set of packets including information from the third set of packets.

In a second aspect of the disclosure, another method, another computer-readable medium, and another apparatus are provided. The apparatus may be configured to determine a first bitmap indicating a first set of packets successfully received by the first device from a source device over a first communications link; receive, from a second device over a second communications link, a second bitmap indicating a second set of packets received by the second device from the source device, each of the first set of packets and the second set of packets comprising at least a fragment of a PDU; determine a third set of packets based on at least one of the first bitmap or the second bitmap, the third set of packets being unsuccessfully received by the second device from the source device; and transmit a fourth set of packets to the second device over the second communications link based on the third set of packets, the fourth set of packets including information from the third set of packets.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a diagram of information bits.

DETAILED DESCRIPTION

Figure 1:
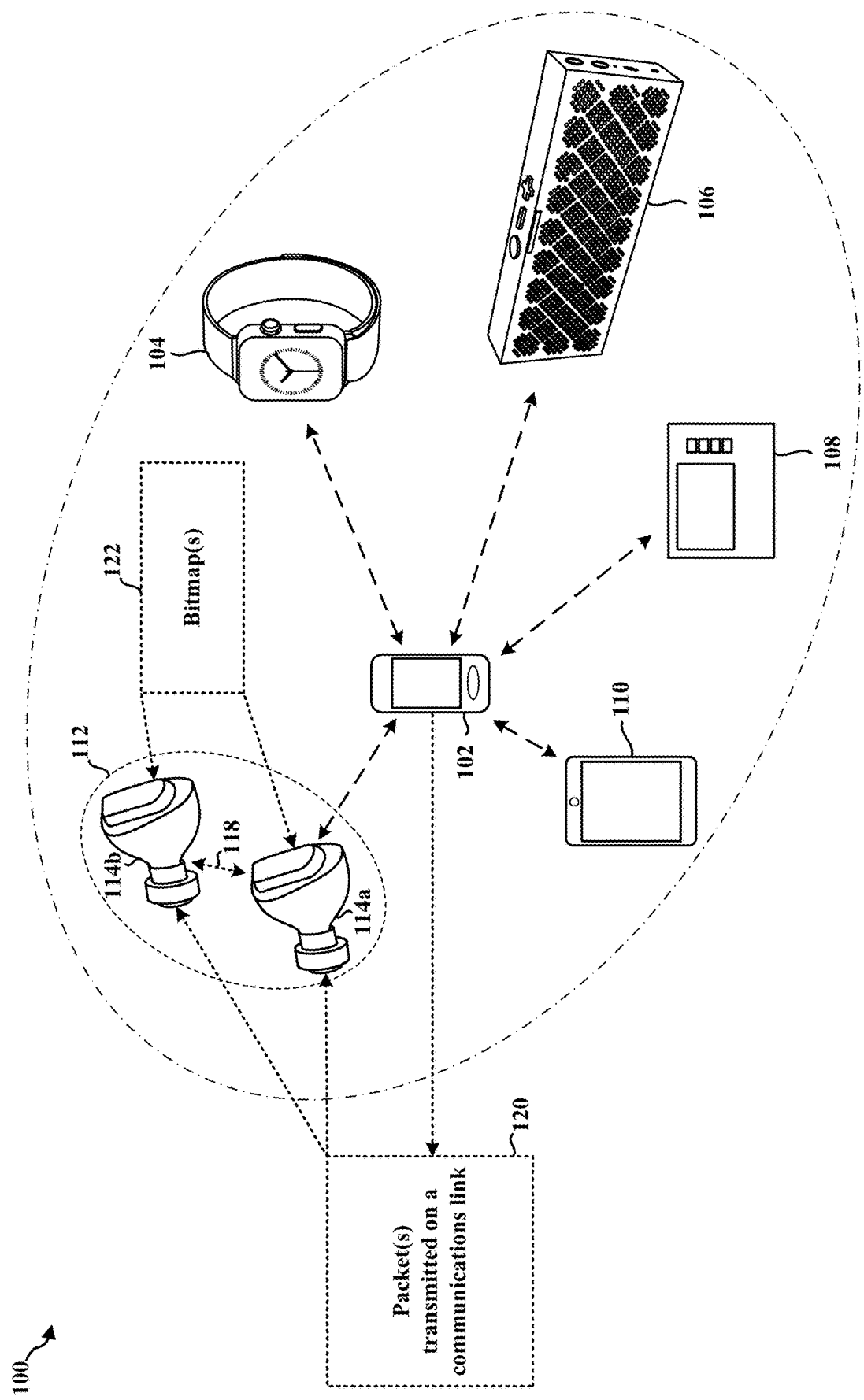
FIG. 1 is a diagram illustrating an example of a short-range wireless communications system, in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 illustrates an example WPAN 100 in accordance with certain aspects of the disclosure. Within the WPAN 100, a wireless source device 102 may use a communications link 116 to communicate with one or more peripheral devices 104, 106, 108, 110, 112 using a short-range wireless communications protocol. The short-range wireless communications protocol may include a Bluetooth® (BT) protocol or a BT Low Energy (BLE) protocol. While the present disclosure may include description in the context of BT and/or BLE, the concepts and techniques described herein may be applicable to other additional and/or alternative wireless communications protocols and standards, such as FlashLinQ, WiMedia, Bluetooth, ZigBee, Wi-Fi based on the IEEE 802.11 standard, Long Term Evolution (LTE), and/or 5G New Radio (NR).

Examples of the source device 102 include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device, a vehicle, an electric meter, a gas pump, a toaster, a thermostat, a hearing aid, a wireless headset, a blood glucose on-body unit, an Internet-of-Things (IoT) device, or any other similarly functioning device.

Examples of the one or more peripheral devices 104, 106, 108, 110, 112 include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device, a vehicle, an electric meter, a gas pump, a toaster, a thermostat, a hearing aid, a wireless headset, a blood glucose on-body unit, an IoT device, or any other similarly functioning device. Although the source device 102 is illustrated in communication with six peripheral devices 104, 106, 108, 110, 112 in the WPAN 100, the source device 102 may communicate with more or fewer than six peripheral devices within the WPAN 100 without departing from the scope of the present disclosure.

A device, such as the source device 102, implementing the BT protocol may operate according to one radio mode, such as basic rate (BR)/enhanced data rate (EDR). Similarly, a device implementing the BLE protocol may operation according to a BLE radio mode. In some aspects, a device, such as the source device 102, may be configured with dual radio modes, and therefore may be able to operate according to the BR/EDR mode or the BLE mode, for example, based on the type of short-rage wireless communication in which the device may engage.

For example, the device may operate according to the BR/EDR mode for continuous streaming of data, for broadcast networks, for mesh networks, and/or for some other applications in which a relatively higher data rate may be more suitable. However, the device may operate according to the BLE mode for short burst data transmissions and/or for some other applications in which power conservation may be desirable and/or a relatively lower data rate may be acceptable. In other aspects, a device may operate according to one or more other radio modes, including proprietary radio mode, such as high speed radio modes, low energy radio modes, isochronous radio modes, etc.

A short-range wireless communications protocol, such as BT, BLE, and/or BR/EDR, may include and/or may use one or more other communications protocols, for example, for establishing and maintaining communications links. As illustrated, the source device 102 may establish a communications link 116 with at least one other device, such as a wireless headset 112, according to at least one communications protocol for short-range wireless communications.

The communications link 116 may include a communications link that adheres to a protocol included and/or for use with BT, BLE, BR/EDR, etc. In one aspect, the communications link 116 may include an asynchronous connectionless (ACL) link. With ACL, the source device 102 may connect (or "pair" in the terminology of the BT specification) with a second device, such as the headset 112. The connection is asynchronous in that the two devices may not need to synchronize, time-wise, data communications between each other to permit communication of data packets via the communications link 116.

Logical Link Control and Adaptation Protocol (L2CAP) may be used within the BT protocol stack to pass packets to either the host controller interface (HCI) or, for a "hostless" system, directly to the link manager/ACL link. An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In one aspect, the communications link 116 may include an Advanced Audio Distribution Profile (A2DP) link. An A2DP link provide for a point-to-point link between a source device, such as the source device 102, and a sink device, such as the headset 112. With an A2DP link, data packets including audio may be transmitted over an ACL data channel, and other information, for example, for controlling the audio stream, may be transmitted over a separate control channel. The data packets may occur non-periodically.

In another aspect, the communications link 116 may support synchronous logical transport mechanisms between a "master device" and a "slave device." For example, the communications link 116 may include a synchronous connection oriented (SCO) link. An SCO link may provide a symmetric point-to-point link between a master device, such as the source device 102, and a slave device, such as the headset 112, using time slots reserved for BT communications. However, an SCO link may not support retransmission of data packets, which may be unsatisfactory in audio streaming and/or voice use cases in which a dropped audio or voice packet may reduce the quality of the user experience.

In a further aspect, then, the communications link 116 may include an extended SCO (eSCO) link. An eSCO link may provide a symmetric or asymmetric point-to-point link between a master device and a slave device using time slots reserved for BT communications, and may also provide for a retransmission window following the reserved time slots. Because retransmissions may be facilitated using the retransmission window, an eSCO link may be suitable for audio streaming and/or voice use cases because a dropped audio or voice packet may be retransmitted, and therefore the probability of successfully receiving a data packet may be increased.

In one aspect, the communications link 116 may include an isochronous (ISO) link. With an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped and the receiving device may continue to receive the stream without data from the dropped data packet.

Due to various factors, wireless devices may cause congestion on the frequencies used for wireless channels, such as a wireless channel on which the communications link 116 is carried. Consequently, wireless communication channels, including the wireless communications channel on which the communications link 116 is carried, may be "noisy" in that static, congestion, and/or other interference may introduce random signals on the same frequency bands as those reserved to communicate over established the communications link 116. Such static, congestion, interference, and/or other random signals may cause errors to packets transmitted on the communications link 116 and/or may cause packets to be unreceived over the communications link 116.

In some standards and protocols, such as BLE and/or BR/EDR, the source device 102 may detect errors in a packet and/or a dropped/missed/unreceived packet through the use of cyclic redundancy check (CRC) validation and through the use of message integrity code (MIC) validation. MIC validation may be used when a packet is encrypted. For example, failure of CRC validation may indicate one or more errors in a received packet and failure of MIC validation may indicate that another packet has been unreceived (although failure of CRC validation may also indicate another packet has been unreceived and/or failure of MIC validation may also indicate one or more errors in a received packet).

CRC validation and MIC validation may be based on generating CRC values and MICs, respectively, based on received packets and respectively comparing those generated CRC values and MICs to CRC and MICs included in received packets. Specifically, a receiving device that receives a packet, such as the headset 112, may first generate a CRC value or a CRC checksum based on the received packet, such as based on a payload and, if applicable, a MIC included in the received packet. The receiving device may compare the generated CRC value with a CRC value included in the received packet. If the generated CRC value matches the CRC value included in the received packet, then the received packet may be validated for CRC. The CRC-validated received packet may then be decrypted. However, if the generated CRC value does not match the CRC value included in the received packet, then the receiving device may determine that the received packet fails CRC validation. If the receiving device determines the received packet fails CRC validation, then the received packet may include errors and/or may be corrupted. In one configuration, the receiving device may discard the received packet that fails CRC validation; however, in another configuration, the receiving device may attempt to recover the received packet, for example, using one or more error correction techniques.

If the received packet passes CRC validation and is encrypted, then the receiving device may decrypt the received packet to obtain a decrypted payload and a decrypted MIC. For MIC validation, the receiving device may generate a MIC based on the decrypted payload, and compare the generated MIC with the MIC obtained from the decrypted received packet. If the generated MIC matches the decrypted MIC, then the receiving device may determine that the received packet is successfully decrypted. When the received packet is successfully decrypted, the decoded and decrypted payload of the received packet may be provided to another layer of the receiving device, such as a coder-decoder (codec) of the receiving device that may cause the payload data of the received packet to be output by the receiving device, for example, as audio through speakers of the headset 112.

If the generated MIC does not match the decrypted MIC of the received packet, then the receiving device may determine that the received packet is unsuccessfully decrypted. When the received packet is unsuccessfully decrypted, then a different packet may have been missed or the received packet may be erroneous or otherwise corrupted. In one configuration, the receiving device may discard the received packet that fails MIC validation; however, in another configuration, the receiving device may attempt to recover the received packet.

Referring again to FIG. 1, in an illustrative aspect, the source device 102 may establish the communications link 116 with the wireless headset 112. In some configurations, however, the wireless headset 112 may include two earpieces 114a, 114b that implement a protocol stack, such as a BT protocol stack configured for BR/EDR, at respective components and/or circuitries. Thus, the communications link 116 may be established at a protocol stack through a first or "primary" earpiece 114a of the headset 112. In effect, when the source device 102 establishes the communications link 116 with the headset 112, the communications link 116 is established through the primary earpiece 114a. For example, a logical link, such as an ACL link, L2CAP link, etc., may exist at one or more layers of the protocol stack through the primary earpiece 114a.

The source device 102 may transmit a set of packets 120 over the communications link 116 to the headset 112. Each of the packets 120 may be a data packet. For example, each of the packets 120 may include a protocol data unit (PDU) having a payload, such as an L2CAP PDU. When one of the packets 120 is decoded and decrypted, the payload may be obtained and output, for example, as audio through a speaker of the headset 112. As packets 120 are streamed over the communications link 116, the headset 112 may stream audio through a speaker of the headset 112.

According to various configurations, each of the packets 120 may be transmitted to the headset 112 by addressing the primary earpiece 114a, for example, using a logical transport address (LT_ADDR) or access address of the protocol stack through the primary earpiece 114a. Accordingly, when configured, the primary earpiece 114a may provide (either implicitly or explicitly) acknowledgement (ACK)/negative ACK (NAK) feedback to the source device 102 for each of the packets 120 (e.g., after decoding and decrypting each of the packets 120).

The communications link 116 toward the primary earpiece 114a may be encrypted in order for MIC validation to be applied by the headset 112. The communications link 116 between the source device 102 and the primary earpiece 114a may be encrypted using an encryption mode. In one configuration, the communications link 116 may be encrypted with an Advanced Encryption Standard (AES) with cipher block chaining message authentication code (CBC-MAC) (CCM) (AES-CCM) mode. For example, the source device 102 may encrypt each of the packets 120 using a CCM encryption function, and then the source device 102 may transmit the encrypted packets 120 over the communications link 116 to the primary earpiece 114a. Correspondingly, the primary earpiece 114a may receive each of the packets 120 over the communications link 116, and the primary earpiece 114a may decrypt each of the packets 120 using a CCM decryption function. In other configurations, the communications link 116 may be encrypted using different encryption modes, and each of the set of packets 120 may be encrypted and decrypted using other encryption functions and/or algorithms.

In order to maintain consistent packet numbering across each of the packets 120, both the source device 102 and the primary earpiece 114a may maintain a respective packet counter for packet numbers corresponding to the packets 120. According to one configuration, the source device 102 may increment its packet counter when each packet of the packets 120 is encrypted, for example, the source device 102 may increment its packet counter when each of the packets 120 is provided to the encryption function of the source device 102. In various configurations, the source device 102 may refrain from incrementing its packet counter for unencrypted and/or packets that do not include a payload. Further, the source device 102 may refrain from incrementing its packet counter when one of the packets 120 is retransmitted.

Correspondingly, the primary earpiece 114a may increment its packet counter after each packet of the packets 120 is received—for example, the primary earpiece 114a may increment its packet counter when each of the packets 120 is provided to the decryption function of the primary earpiece 114a. In various configurations, the primary earpiece 114a may refrain from incrementing its packet counter for unencrypted and/or packets that do not include a payload. In this way, the source device 102 and the primary earpiece 114a may maintain alignment between their respective packet counters.

In one configuration, the source device 102 and the primary earpiece 114a may both initialize the respective packet counters to the same value. For example, the source device 102 and the primary earpiece 114a may be configured with the same predetermined value with which to initialize the packet counters. In another configuration, the value with which the packet counters are to be initialized may be advertised, such as by the source device 102 prior to transmission of the packets 120.

In some configurations, the source device 102 and the primary earpiece 114a each include a set of packet counters. For example, the source device 102 may include a transmission (TX) packet counter that is to be aligned with a reception (RX) packet counter of the primary earpiece 114a. Similarly, the source device 102 may include an RX packet counter that is to be aligned with a TX packet counter of the primary earpiece 114a. These TX packet counter of the source device 102 may remain aligned with the RX packet counter of the primary earpiece 114a, for example, because the source device 102 may increment its TX packet counter and the primary earpiece 114a may increment its RX packet counter when a new non-zero length packet is respectively transmitted by the source device 102 and received by the primary earpiece 114a.

In some configurations, ACK/NAK feedback (either implicitly or explicitly) provided to the source device 102 by the primary earpiece 114a may prevent the packet counter of the primary earpiece 114a from becoming unaligned with the packet counter of the source device 102—for example, the source device 102 may retransmit the first packet of the packets 120 when the first packet is unreceived by the primary earpiece 114a and NAK feedback for the first packet is indicated at the source device 102.

While the packet counters across the source device 102 and the primary earpiece 114a remain aligned, nonces generated by the source device 102 may correspond to nonces generated by the primary earpiece 114a, and MIC validation may consistently succeed. Accordingly, the primary earpiece 114a may decrypt each of the packets 120, and obtain each payload. The primary earpiece 114a may then provide each payload to another layer (such as a codec), which may process and/or decode the payload and cause the payload to be output, for example, as audio through a speaker of the primary earpiece 114a.

The headset 112, however, may additionally include the secondary earpiece 114b having its own speaker configured output the payloads of the packets 120 as well. Because the communications link 116 may be established toward the primary earpiece 114a, the secondary earpiece 114b may receive the packets 120 by passively monitoring a channel on which the packets 120 are carried on the communications link 116. That is, the secondary earpiece 114b may "sniff" the packets 120 transmitted over the communications link 116 to the primary earpiece 114a.

As the secondary earpiece 114b may sniff the packets 120 from the source device 102, the secondary earpiece 114b may need to perform CRC and MIC validation separately from the primary earpiece 114a. Like the primary earpiece 114a, then, the secondary earpiece 114b may successfully decrypt a respective one of the packets 120 using a respective nonce that corresponds to the nonce used by the source device 102 to encrypt the respective one of the packets 120. Therefore, the secondary earpiece 114b may maintain a packet counter (e.g., an RX packet counter) that is to remain aligned with the packet counter (e.g., the TX packet counter) of the source device 102.

Similar to the primary earpiece 114a, the secondary earpiece 114b may initialize a packet counter to the same value as the source device 102. In one configuration, the secondary earpiece 114b may be configured with the same predetermined value as the primary earpiece 114a and the source device 102 with which to initialize the packet counter. In other configurations, the value with which the packet counter is to be initialized may be advertised and/or relayed to the secondary earpiece 114b from the primary earpiece 114a.

Potentially, the packet counter (e.g., the RX packet counter) of the secondary earpiece 114b may become unaligned with the packet counter (e.g., the TX packet counter) of the source device 102. For example, the secondary earpiece 114b may drop or miss a first packet of the packets 120 but receive a next packet of the packets 120. However, the secondary earpiece 114b may lack a mechanism to indicate ACK/NAK feedback (either implicitly or explicitly) to the source device 102.

While the packet counters across the source device 102 and the secondary earpiece 114b remain aligned, nonces generated by the source device 102 may correspond to nonces generated by the secondary earpiece 114b, and MIC validation may consistently succeed. Accordingly, the secondary earpiece 114b may decrypt each of the packets 120, and obtain each payload. The secondary earpiece 114b may then provide each payload to another layer (such as a codec), which may process and/or decode the payload and cause the payload to be output, for example, as audio through a speaker of the secondary earpiece 114b.

As the secondary earpiece 114b may sniff the packets 120 from the source device 102, the secondary earpiece 114b may need to perform CRC and MIC validation separately from the primary earpiece 114a. In some aspects, the secondary earpiece 114b may communicate over a short-range communications link 118 with the primary earpiece 114a. The other communications link 118 may be, for example, BT link (e.g., BR/EDR link), a BLE link, a near-field magnetic induction (NFMI) link, or any other suitable short-range wireless communications link. According to one configuration, the secondary earpiece 114b may receive information associated with the source device 102 and/or the communications link 116 from the primary earpiece 114a. In one aspect, the primary earpiece 114a may configure and/or relay one or more parameters to the secondary earpiece 114b, and the one or more parameters may facilitate the reception of a set of packets by the secondary earpiece 114b through the monitoring of the communications link 116.

However, passively monitoring the communications link 116 in order to receive each of the packets 120 may be unreliable. Consequently, the secondary earpiece 114b may miss one or more of the packets 120 while sniffing on the communications link 116. Accordingly, the primary earpiece 114a may relay one or more of the packets 120 that may be missed by the secondary earpiece 114b to the secondary earpiece 114b. In addition, the primary earpiece 114a may miss one or more packets 120 that may have been received by the secondary earpiece 114b and, therefore, the secondary earpiece 114b may relay one or more of the packets 120 that may be missed by the primary earpiece 114a to the primary earpiece 114a. To do so, the primary earpiece 114a and the secondary earpiece 114b may each prepare a respective one of the bitmaps 122 associated with reception of the packets 120 at a respective controller level (see, e.g., the short-range communication controller 252 shown at FIG. 2 and described infra). Both the primary earpiece 114a and the secondary earpiece 114b may identify one or more of the packets 120 that may have been missed by each of the primary 114a and the secondary earpiece 114b based on at least one bitmap 122 generated by the primary earpiece 114a and based on at least one bitmap 122 generated by the secondary earpiece 114b. Accordingly, the primary earpiece 114a and the secondary earpiece 114b may exchange respective bitmaps 122 generated by the primary earpiece 114a and the secondary earpiece 114b. Based on the respective bitmaps 122, the primary earpiece 114a may identify and relay one or more packets 120 missed by the secondary earpiece 114b to the secondary earpiece 114b and/or the secondary earpiece 114b may identify and relay one or more packets 120 missed by the primary earpiece 114a to the primary earpiece 114a. In some configurations, the primary earpiece 114a and/or the secondary earpiece 114b may identify a missed one of the packets 120 and/or generate a respective one of the bitmaps 122 based on a sequence number (SEQN) associated with the missed one of the packets 120.

According to various aspects, at least one of the primary earpiece 114a and/or the secondary earpiece 114b may reconstruct one or more packets 120, at least a portion of which may be received via relay from the other one of the primary earpiece 114a or the secondary earpiece 114b. In some configurations, reconstruction of one or more of the packets 120 may involve two operations. For example, when a PDU (e.g., L2CAP PDU) of one of the packets 120 is fragmented, each of the primary earpiece 114a and the secondary earpiece 114b may obtain all fragments of the PDU in order to recombine the fragments to reconstruct the PDU. Therefore, each of the primary earpiece 114a and the secondary earpiece 114b may acquire information indicating both the payloads of baseband fragments and the "Start/Continue" information for each of the fragments. Such information may be included in the bitmaps 122 generated by each of the primary earpiece 114a and the secondary earpiece 114b. Thus, the bitmaps 122 may include information indicating one or more of the packets 120 that may have been missed (e.g., based on SEQNs associated with the one or more missed packets), as well as information associated with the baseband packets of the one or more packets 120 that may have been missed. For example, while relaying one or more of the packets 120 that may have been missed, one of the primary earpiece 114a or the secondary earpiece 114b may divide one source baseband packet of one of the packets 120 into a set of earpiece baseband packets, and the one of the primary earpiece 114a or the secondary earpiece 114b may provide the set of earpiece baseband packets to the other of the primary earpiece 114a or the secondary earpiece 114b. The other of the primary earpiece 114a or the secondary earpiece 114b may then reconstruct the source baseband packet of the one of the packets 120 as transmitted by the source device 102. The other of the primary earpiece 114a or the secondary earpiece 114b may then combine a reconstructed source baseband packet with one or more other source baseband packets to obtain a complete PDU (e.g., an L2CAP PDU).

Audio traffic over BT classic BR/EDR flows may be asynchronous. To provide reliability of audio traffic to the secondary earpiece 114b, the primary earpiece 114a may selectively relay packets to the secondary earpiece 114b, which may assist the secondary earpiece 114b in recovering lost data. In some configurations, selective relay from the primary earpiece 114a to the secondary earpiece 114b may be implemented at the controller level.

Selective relay may be facilitated through a set of bitmaps 122. A transmission slot of the source device 102 for the headset 112 may be categorized in a bitmap according to a sequence number 0, a sequence number 1, or no data (null). No data or null may commonly occur when no reception occurs in a slot (e.g., an idle slot), the headset 112 is on one of the primary 114a or the secondary earpiece 114b or some other piconet, a synchronization timeout, a CRC error, a MIC error at the primary earpiece 114a (e.g., the secondary earpiece 114b may preserve a MIC-error packet for later recovery), a poll/null reception. Generally, the no data or null bitmap may be for any transmission slot of the source device 102 where the headset 112 does not receive a packet (e.g., ACL packet) from the source device 102.

The headset 112 may generate one or more bitmaps 122 with a set of categories, such as 4 categories. For the 4 categories, 2 bits may be sufficient to mark what occurred in the transmission slot of the source device 102 at the primary earpiece 114a or the secondary earpiece 114b. Further, a bitmap may be added for retransmissions, but may be done by the primary earpiece 114a only. However, for scalability, new categories may be added, which may be defined by 4 bits or one/multiple octets. In addition, a category for zero length L2CAP packet may be added for flushed packets.

Figure 2:
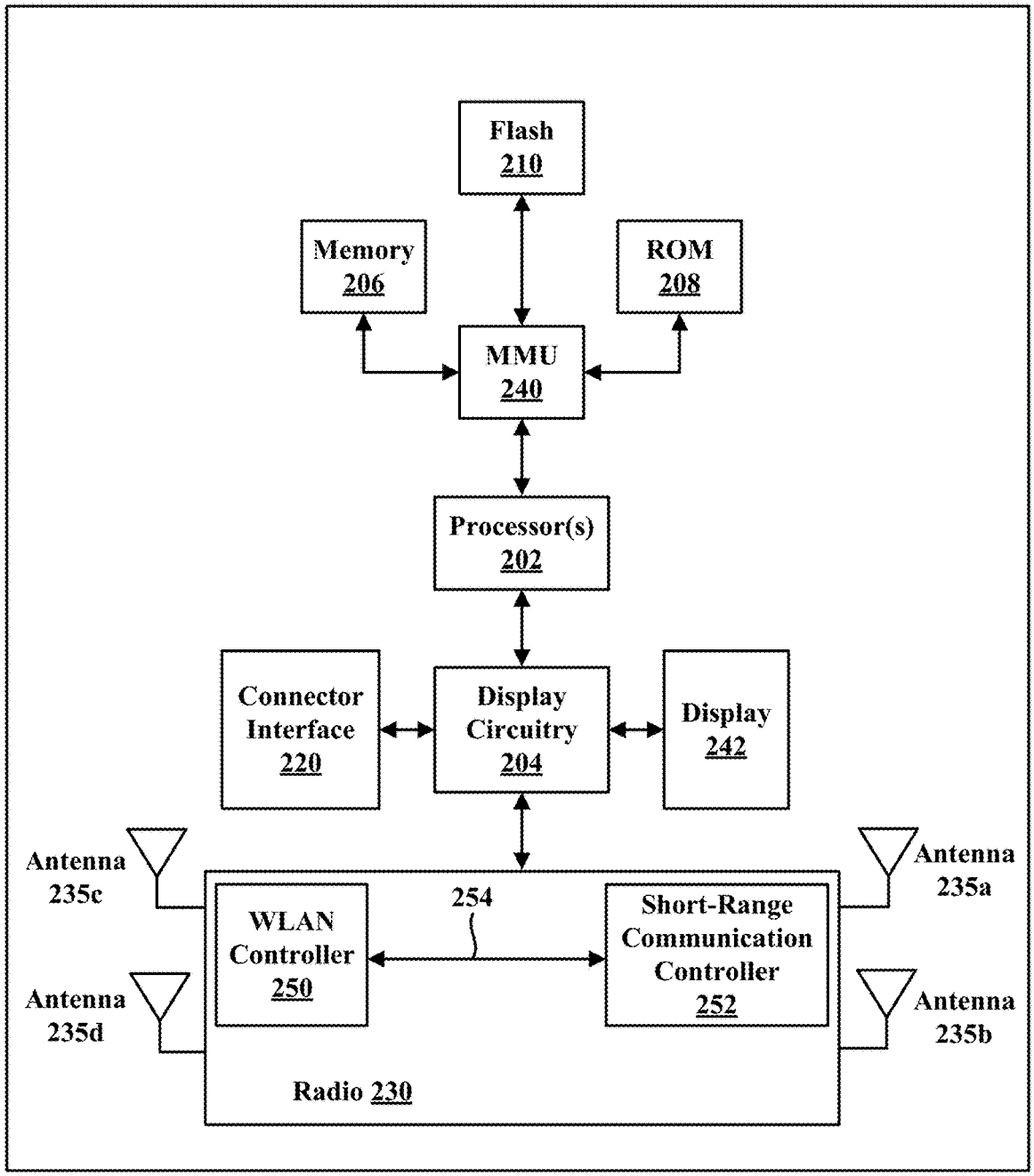
FIG. 2 is block diagram of a short-range wireless communications device, in accordance with certain aspects of the disclosure.

FIG. 2 is block diagram of a wireless device 200 in accordance with certain aspects of the disclosure. The wireless device 200 may correspond to, for example, the source device 102, and/or one of the peripheral devices 104, 106, 108, 110, 112 in FIG. 1. In certain configurations, the wireless device 200 may be, for example, a BT and/or BLE device that is configured to construct a PDU (e.g., an L2CAP PDU) using a selective relay mechanism for selectively relaying packets and/or corresponding information.

As shown in FIG. 2, the wireless device 200 may include a processing element, such as a processor(s) 202, which may execute program instructions for the wireless device 200. The wireless device 200 may also include display circuitry 204, which may perform graphics processing and provide display signals to a display 242. The processor(s) 202 may also be coupled to a memory management unit (MMU) 240, which may be configured to receive addresses from the processor(s) 202 and translate those addresses to locations in memory, such as memory 206, ROM 208, Flash memory 210, and/or to other circuits or devices, such as the display circuitry 204, a radio 230, a connector interface 220, and/or the display 242. The MMU 240 may be configured to perform memory protection and page table translation or set up. In some aspects, the MMU 240 may be included as a portion of the processor(s) 202.

As shown, the processor 202 may be coupled to various other circuits of the wireless device 200. For example, the wireless device 200 may include various types of memory, the connector interface 220, which may allow for coupling to the computer system, the display 242, and/or wireless communications circuitry, which may facilitate Wi-Fi, BT, BLE, etc. The wireless device 200 may include a plurality of antennas 235a, 235b, 235c, 235d, for performing wireless communication with other short-range wireless communications devices, including BT devices, BLE devices, etc.

In certain aspects, the wireless device 200 may include hardware and software components (a processing element) configured to separately check the header of the data packet for errors and perform majority voting of a data packet, for example, using the techniques described herein. The wireless device 200 may also include firmware or other hardware/software for controlling short-range wireless communications operations, such as BT operations, BLE operations, etc. In addition, the wireless device 200 may store and execute a WLAN software driver for controlling WLAN operations.

The wireless device 200 may be configured to implement part or all of the error correction techniques described herein, for example, by executing program instructions stored on a memory medium, such as a non-transitory computer-readable memory medium, and/or through hardware or firmware operation. In other aspects, the error correction techniques described herein may be at least partially implemented by a programmable hardware element, such as an field programmable gate array (FPGA), and/or as an application specific integrated circuit (ASIC).

In certain aspects, the radio 230 may include separate controllers configured to control communications for various respective radio access technology (RAT) protocols. For example, as shown in FIG. 2, radio 230 may include a wireless local area network (WLAN) controller 250 configured to control WLAN communications and a short-range communications controller 252 configured to control short-range communications, such as BT communications, BLE communications, etc. A coexistence interface 254 may be used for sending information between the WLAN controller 250 and the short-range communications controller 252.

In some aspects, one or more of the WLAN controller 250 and/or the short-range communications controller 252 may be implemented as hardware, software, firmware or some combination thereof.

In certain aspects, the WLAN controller 250 may be configured to communicate with a second device using a WLAN link using all of the antennas 235a, 235b, 235c, 235d. In certain configurations, the short-range communications controller 252 may be configured to implement a short-range wireless communications protocol stack, such as a BT stack (FIG. 3A, infra) and/or a BLE stack (FIG. 3B, infra), and communicate with at least one second wireless device using one or more of the antennas 235a, 235b, 235c, 235d. The short-range communications controller 252 may be configured to reconstruct a PDU (e.g., an L2CAP PDU) when the wireless device 200 is receiving or passively monitoring for packets sent by a source wireless device.

Figure 3A:
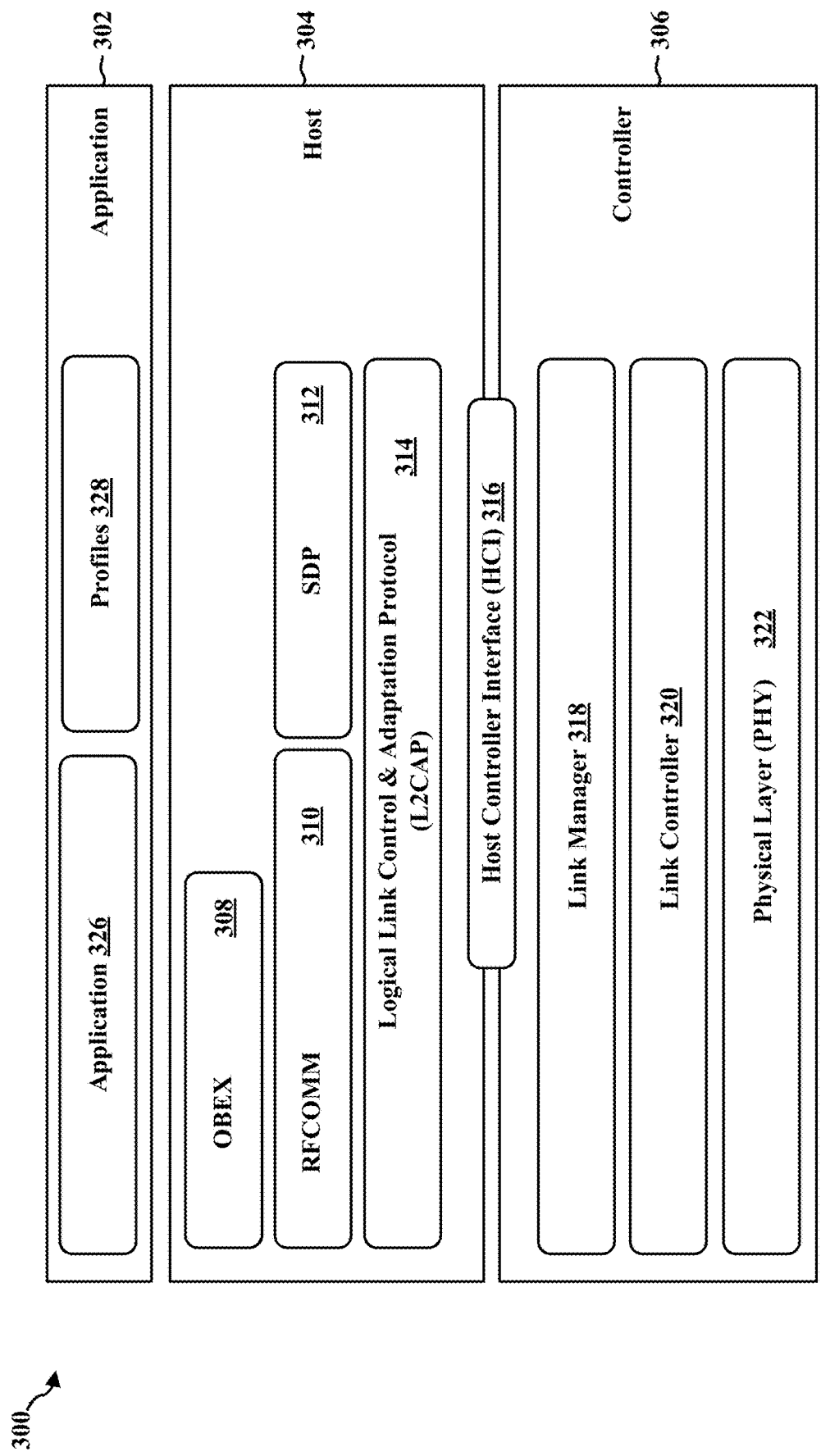
FIG. 3A is a diagram illustrating a Bluetooth (BT) protocol stack that may be implemented by a BT device, in accordance with certain aspects of the disclosure.

FIG. 3A illustrates a BT protocol stack 300 that may be implemented in a wireless device in accordance with certain aspects of the disclosure. For example, the BT protocol stack 300 may be implemented by one or more of processor(s) 202, memory 206, Flash memory 210, ROM 208, the radio 230, and/or the short-range communication controller 252 illustrated in FIG. 2.

Referring to FIG. 3A, the BT protocol stack 300 may be organized into lower layer(s), a middle layer(s), and upper layer(s). The lower layer(s) of the BT protocol stack 300 may include a controller stack 306, which may be used for, inter alia, hardware interface management, link establishment, and link management. The middle layer(s) of the BT protocol stack 300 may include a host stack 304, which may be used for, inter alia, application (layer) interface management to allow an application (layer) to access short-range wireless communications. The higher layer(s) of the BT protocol stack 300 may include an application layer 302, which may include one or more applications and one or more profiles that allow the one or more applications to use BT communications.

The controller stack 306 may include a physical (PHY) layer 322. The PHY layer 322 may include, for example, a radio and/or a baseband processor. In some aspects, the PHY layer 322 may define the mechanism for transmitting a bit stream over a physical link or channel that connects BT devices. The bit stream may be grouped into code words or symbols, and converted to a data packet that is transmitted over a wireless transmission medium. The PHY layer 322 may provide an electrical, mechanical, and/or procedural interface to the wireless transmission medium. The PHY layer 322 may be responsible for modulation and demodulation of data into radio frequency (RF) signals for transmission over the air. The PHY layer 322 may describe the physical characteristics of a wireless device's receiver/transmitter. The physical characteristics may include modulation characteristics, radio frequency tolerance, sensitivity level, etc.

The controller stack 306 may further include a link controller 320. The link controller 320 may be responsible for properly formatting data for providing to and obtaining from the PHY layer 322. Further, the link controller 320 may perform synchronization of links, including logical links including ACL links, A2DP links, SCO links, eSCO links, ISO links, etc. The link controller 320 may be responsible for executing commands and instructions issued by a link manager 318, including establishing and maintaining links instructed by the link manager 318.

The link manager 318 may translate host controller interface (HCI) 316 commands into controller-level operation, such as baseband-level operations. The link manager 318 may be responsible for establishing and configuring links and managing power-change requests, among other tasks. Each type of logical link, such as ACL links, A2DP links, SCO links, eSCO links, ISO links, etc., may be associated with a specific packet type. For example, an SCO link may provide reserved channel bandwidth for communication between a master device and a slave device, and support regular, periodic exchange of data packets with no retransmissions. An eSCO link may provide reserved channel bandwidth for communication between a master device and a slave device, and support regular, periodic exchange of data packets with retransmissions. An ACL link may exist between a master device and a slave device from the beginning of establishment of a connection between the master device and the slave device, and the data packets for ACL links may include encoding information in addition to a payload.

The link manager 318 may communicate with the host stack 304 through a host controller interface (HCI) 316—for example, the link manager 318 may translate HCI 316 commands into controller-level operations, such as baseband-level operations. The HCI 316 may act as a boundary between the lower layers, such as the controller stack 306, of the BT protocol stack 300 and the other layers of the BT protocol stack, such as the host stack 304 and/or the application layer 302. The BT specification may define a standard HCI to support BT systems that are implemented across two separate processors. For example, a BT system on a computer might use the BT system's own processor to implement the lower layers of the stack, such as the PHY layer 322, the link controller 320, and/or the link manager 318. The BT system might use a processor of a BT component to implement the other layers, such as the host stack 304 and the application layer 302. In some aspects, however, the BT system may be implemented on a same processor, and such a BT system may be referred to as "hostless."

The host stack 304 may include at least a Logical Link Control and Adaptation Protocol (L2CAP) layer 314, a service discovery protocol (SDP) layer 312, a radio frequency communication (RFCOMM) layer 310, and an object exchange (OBEX) layer 308. The L2CAP layer 314 is implemented above the HCI 316, and may communicate through the HCI 316. The L2CAP layer 314 may be primarily responsible for establishing connections across some existing links, such as logical links including ACL links, and/or requesting some links if those do not already exist. Further, the L2CAP layer 314 may implement multiplexing between different higher-layer protocols, such as SDP protocols and RFCOMM protocols, which may to allow different applications to use a single link, such as a logical link, including an ACL link. In addition, the L2CAP layer 314 may repackage data packets received from higher layers into a format expected by lower layers. The L2CAP layer 314 may employ the concept of channels to keep track of where data packets come from and where data packets should go. A channel may be a logical representation of the data flow or stream between the L2CAP layer 314 at a transmitting device (such as a master device) and another L2CAP layer 314 at a receiving device (such as a slave device.

The SDP layer 312 may define actions for both servers and clients of BT services. The BT specification defines a service as any feature that may be usable by another (remote) BT device. An SDP client may communicate with an SDP server using a reserved channel on an L2CAP link to discover what services are available. When the SDP client finds the desired service, the SDP client may request a separate connection to use the service. The reserved channel may be dedicated to SDP communication so that a device knows how to connect to the SDP service on any other device. An SDP server may maintain an SDP database, which may include a set of service records that describe the services the SDP server offers. Along with information describing how an SDP client can connect to the service, the service records may contain a universally unique identifier (UUID) of the service.

The RFCOMM layer 310 may emulate the serial cable line settings and status of an RS-232 serial port. The RFCOMM layer 310 may connect to the lower layers of the BT protocol stack 300 through the L2CAP layer 314. By providing serial-port emulation, the RFCOMM layer 310 may support legacy serial-port applications. The RFCOMM layer 310 may also support the Object Exchange (OBEX) layer 308.

The OBEX layer 308 may define a communication protocol that may be used by devices to exchange data objects, and the data objects may also be defined by the OBEX layer 308. A BT device that wants to set up an OBEX communication session with another device may be considered the client device. The client initially may send one or more SDP requests to ensure that the other device can act as a server of OBEX services. If the server device can provide OBEX services, the server device may respond with the OBEX service record of the server device. The OBEX service record may contain an RFCOMM channel number that the client device may use to establish an RFCOMM channel. Further communication between the two devices may be conveyed in packets, which may contain requests, responses, and/or data. The format of the packet may be defined by the OBEX session protocol.

The application layer 302 may include at least one application 326, with which a user may interact and which may access BT communications for various functionality. The application 326 may access BT communications through one or more profiles 328, which may describe a variety of different types of tasks. By following procedures of one or more profiles 328, the application 326 may use BT communications according to a BT specification.

Figure 3B:
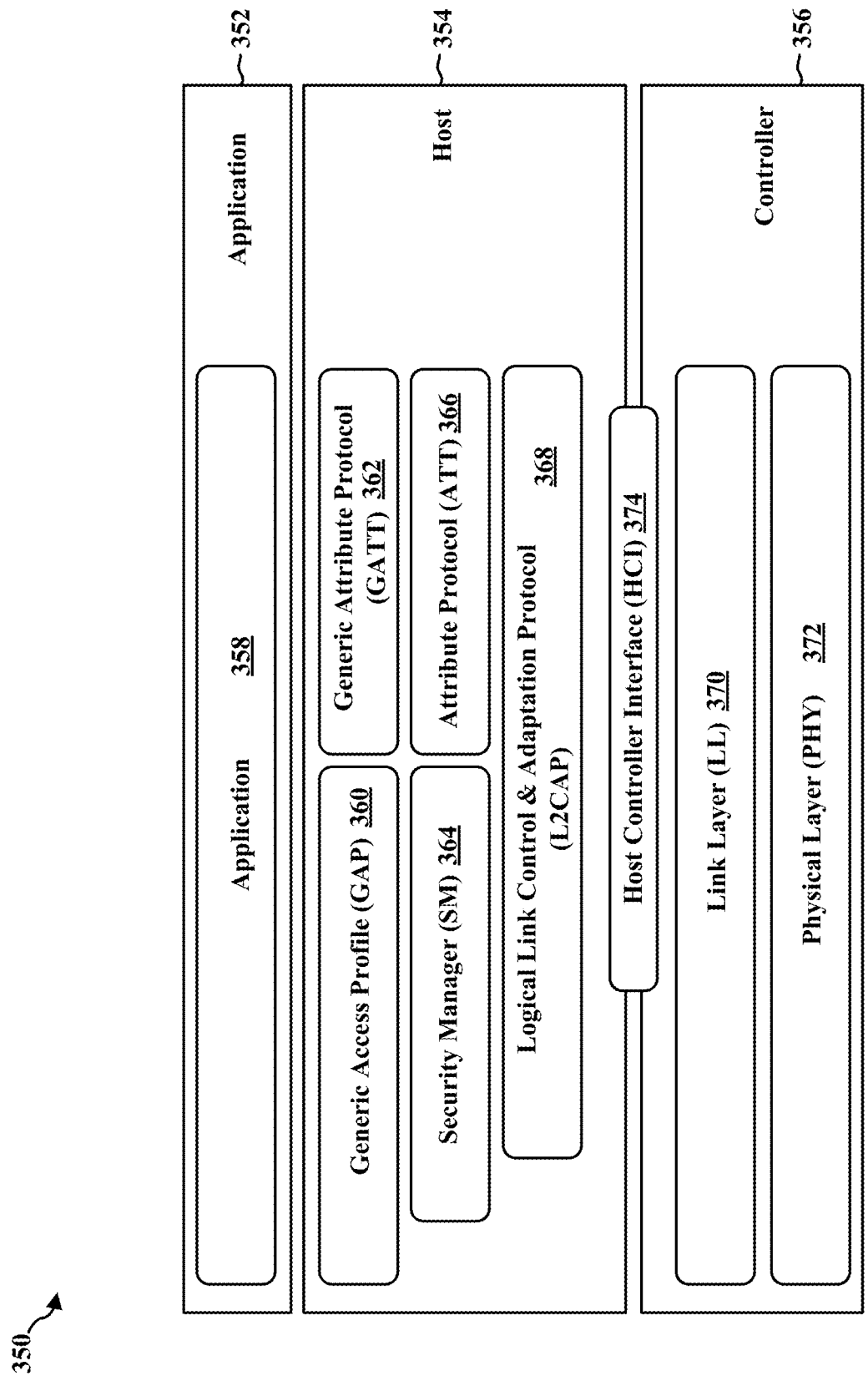
FIG. 3B is a diagram illustrating a BT Low Energy (BLE) protocol stack that may be implemented by a BLE device, in accordance with certain aspects of the disclosure.

FIG. 3B illustrates a BLE protocol stack 350 that may be implemented in a BLE device. For example, the BLE protocol stack 350 may be implemented by one or more of processor(s) 202, memory 206, Flash memory 210, ROM 208, the radio 230, and/or the short-range communications controller 252 illustrated in FIG. 2.

The BLE protocol stack 350 may be organized into three layers, which may include, an application layer 352, a host stack 354, and a controller stack 356. The controller stack 356 may be below the host stack 354 and the application layer 352 in the BLE protocol stack 350. The controller stack 356 may include a PHY layer 372 and a LL 370.

The PHY layer 372 may define the mechanism for transmitting a bit stream over a physical link that connects BLE devices. The bit stream may be grouped into code words or symbols, and converted to a data packet that is transmitted over a transmission medium. The PHY layer 372 may provide an electrical, mechanical, and procedural interface to the transmission medium. The shapes and properties of the electrical connectors, the frequency band used for transmission, the modulation scheme, and similar low-level parameters may be specified by the PHY layer 372.

The LL 370 is responsible for low-level communication over the PHY layer 372. The LL 370 manages the sequence and timing for transmitting and receiving data packets, and using a LL protocol, communicates with other devices regarding connection parameters and data flow control. The LL 370 also provides gatekeeping functionality to limit exposure and data exchange with other devices. If filtering is configured, the LL 370 maintains a list of allowed devices and will ignore all requests for data exchange from devices not on the list. The LL 370 may also reduce power consumption. In some aspects, the LL 370 may include a company's proprietary LL that may be used to discover peer devices, and establish a secure communication channel therewith. In certain aspects, the LL 370 may be responsible for transporting data packets between devices in a WPAN. Each data packet may include an access address, which specifies the type of logical transport used to carry the data packet. Logical transports may exist between a master device and slave devices. Additionally, some logical transports may carry multiple logical links.

The BLE protocol stack 350 may include an HCI 374, which may act as a boundary between the lower layers (such as the controller stack 356) of the BLE protocol stack 350 and the other layers of the BLE protocol stack (such as the host stack 354 and the application layer 352). In addition, the host stack 354 may communicate with a BLE controller (such as the short-range communications controller 252 in FIG. 2) in a wireless device using the HCI 374. The LL 370 may use the HCI 374 to communicate with the host stack 354 of the BLE protocol stack 350. While some BLE systems may be "hostless," in that the host stack 354 and the controller stack 356 may be implemented on a same processor, the HCI 374 may also allow the host stack 354 to communicate with different controller stacks 356, such as when the controller stack 356 is implemented on a second processor.

The host stack 354 may include a generic access profile (GAP) 360, a generic attribute protocol (GATT) 362, a security manager (SM) 364, an attribute protocol (ATT) 366, and an L2CAP layer 368. The L2CAP layer 368 may encapsulate multiple protocols from the upper layers into a data packet format (and vice versa). The L2CAP layer 368 may also break packets with a large data payload from the upper layers into multiple packets with the data payload segmented into smaller size data payloads that fit into a maximum payload size (for example, twenty-seven bytes) on the transmit side. Similarly, the L2CAP layer 368 may receive multiple data packets carrying a data payload that has been segmented, and the L2CAP layer 368 may combine the segmented data payload into a single data packet carrying the data payload that will be sent to the upper layers (such as the application layer 352).

The ATT 366 includes a client/server protocol based on attributes associated with a BLE device configured for a particular purpose (examples may include monitoring heart rate, temperature, broadcasting advertisements, etc.). The attributes may be discovered, read, and written by peer devices. The set of operations which are executed over ATT 366 may include, but are not limited to, error handling, server configuration, find information, read operations, write operations, queued writes, etc. The ATT 366 may form the basis of data exchange between BLE devices.

The SM 364 may be responsible for device pairing and key distribution. A security manager protocol implemented by the SM 364 may define how communications with the SM of a counterpart BLE device are performed. The SM 364 provides additional cryptographic functions that may be used by other components of the BLE protocol stack 350. The architecture of the SM 364 used in BLE is designed to minimize recourse requirements for peripheral devices by shifting work to an assumingly more powerful central device. BLE uses a pairing mechanism for key distribution. The SM 364 provides a mechanism to not only encrypt the data but also to provide data authentication.

Above the host stack 354 in the BLE protocol stack 350, the application layer 352 may include an application 358, such as a user application which interfaces with the host stack 354 of the BLE protocol stack 350 for various functionality through BLE communications.

Referring back to the host stack 354, the GATT 362 may provide a service framework using the attribute protocol for discovering services, and for reading and writing characteristic values on a peer device. The GATT 362 may interface with the application 358, for example, through a profile, which may define a collection of attributes and any permission needed for the attributes to be used in BLE communications. The GAP 360 may provide an interface for the application 358 to initiate, establish, and manage connections with other BLE devices.

In some aspects, a wireless device, such as the source device 102, the wireless device 200, etc., may be configured to communicate according to different standards and/or protocols. For example, the wireless device may be configured with both BT and BLE for short-range wireless communications. Accordingly, the wireless device may be configured with both the BT protocol stack 300 and the BLE protocol stack 350. In some aspects, one or more layers may be configured for use in both the BT protocol stack 300 and the BLE protocol stack 350—for example, the L2CAP layers 314, 368 of the protocol stacks 300, 350 may be configured for dual mode short-range wireless communications using either BT or BLE.

Figure 4A:
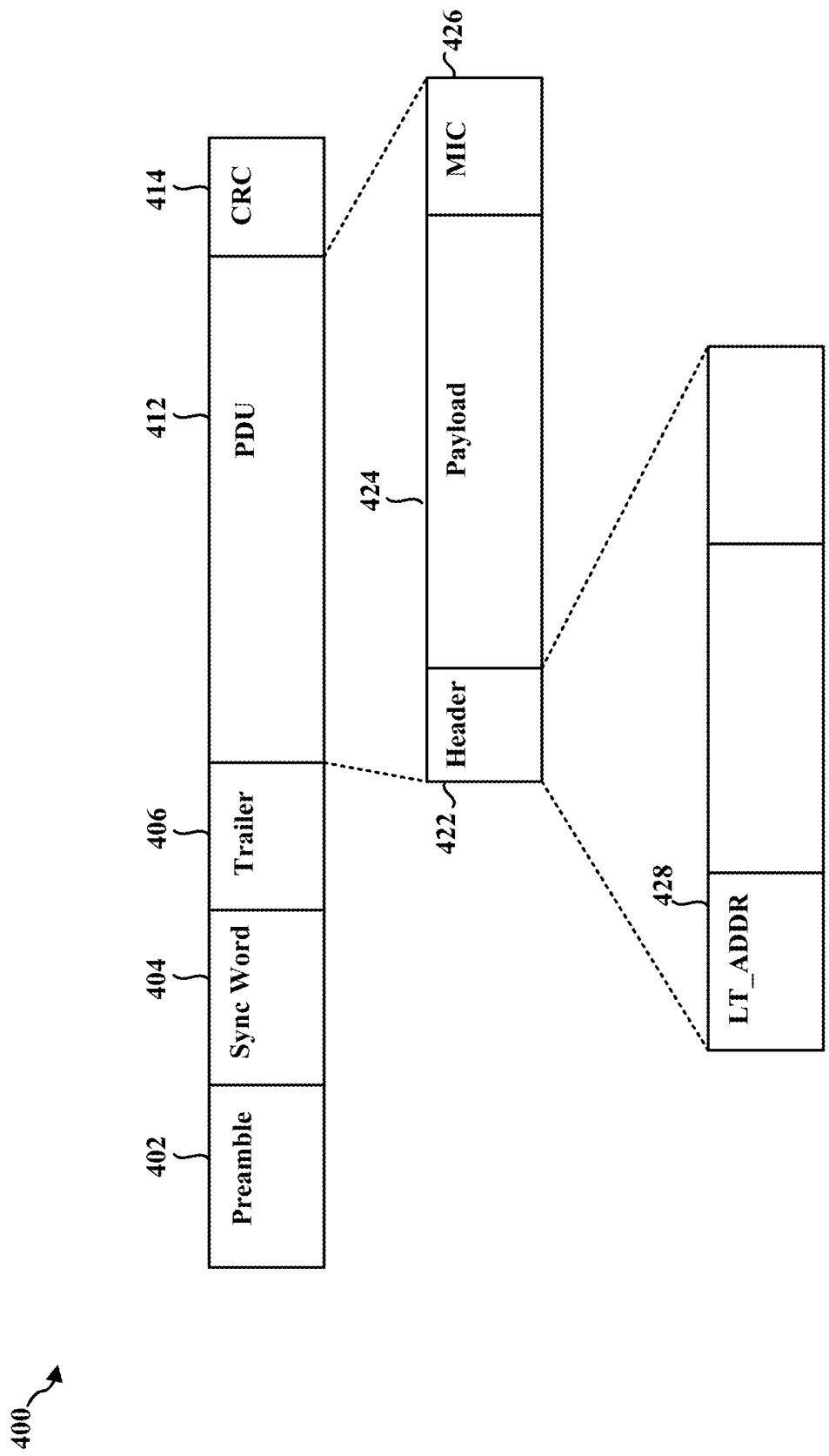
FIG. 4A is a diagram illustrating a BT data packet, in accordance with certain aspects of the disclosure.

FIG. 4A is a diagram illustrating a data packet 400 in accordance with certain aspects of the present disclosure. The data packet may be used with various short range wireless communications technologies, such as BT and including BR/EDR. The data packet 400 may include a preamble 402, a sync word 404, a trailer 406, a PDU 412, and a CRC 414. In certain configurations, the data packet 400 may not include the CRC 414.

In certain configurations, the PDU 412 may include a header 422, a payload 424, and a MIC 426. The MIC includes information that may be used to authenticate a data packet, for example, when the data packet is encrypted. In other words, the MIC may be used by the receiving device to confirm and/or authenticate that the message came from the stated transmitting device, and to confirm that the payload 424 has not been changed (which may provide data packet integrity). The MIC 426 protects both payload integrity and the authenticity of the data packet 400 by enabling a receiving device who also possess the secret key to detect any changes to the payload 424. In some aspects, the MIC 426 may be present when the packet 400 is encrypted, such as encrypted using AES-CCM encryption, but may be absent when the packet 400 is unencrypted.

In certain configurations, such as BR/EDR, the payload 424 (excluding the MIC 426 and header 422) may include an unencrypted baseband packet. For example, the payload 424 may include a payload portion (excluding a MIC and payload header) of an unencrypted baseband ACL-user data (ACL-U) packet.

In some aspects, the header 422 of the PDU 412 may include a plurality of fields, including at least an LT_ADDR 428. The LT_ADDR may indicate a logical transport address. The LT_ADDR 428 may be associated with a logical link. For example, a logical transport address included in the LT_ADDR 428 may indicate a type of logical link, including ACL, A2DP, eSCO, ISO, etc.

In certain configurations, the header 422 of the PDU 412 may include a logical link identifier (LLID). The LLID may be a two-bit field of the header 422.

Figure 4B:
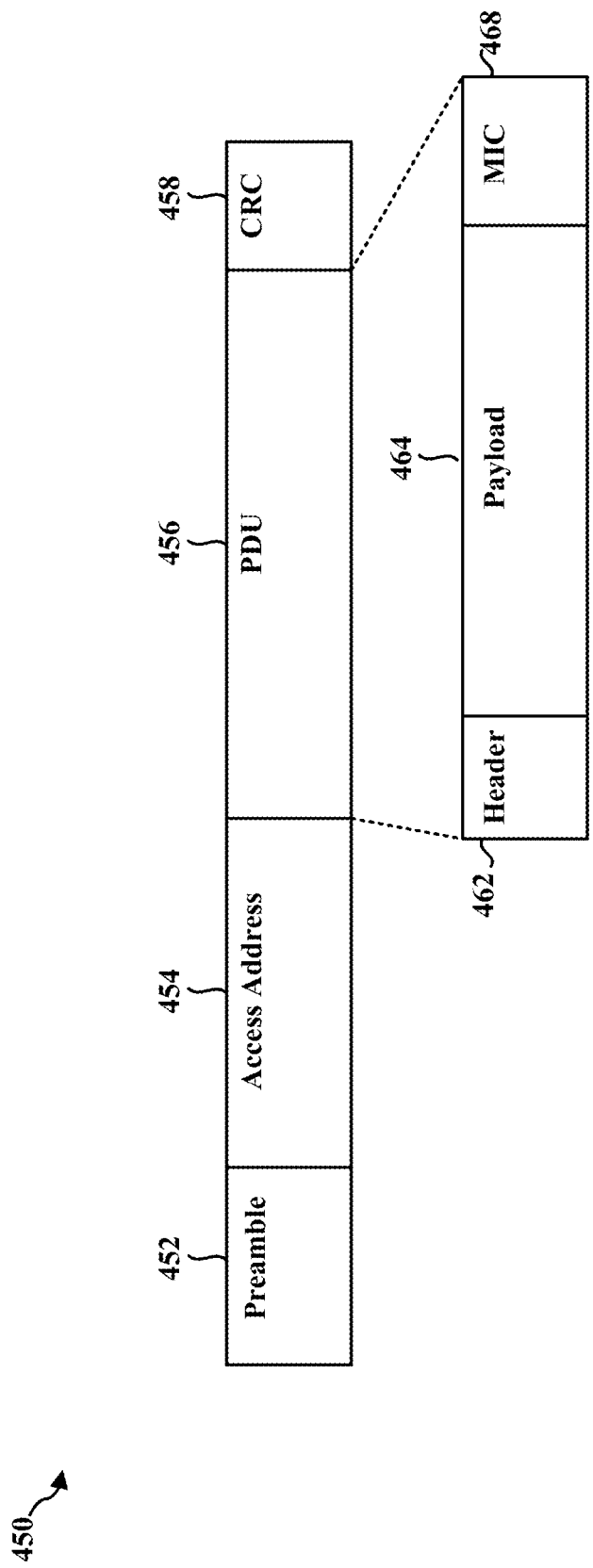
FIG. 4B is a diagram illustrating a BLE data packet, in accordance with certain aspects of the disclosure.

FIG. 4B is a diagram illustrating a data packet 450 in accordance with certain aspects of the present disclosure. The data packet may be used with various short range wireless communications technologies, such as BLE. The data packet 450 may include a preamble 452, an access address 454, a PDU 456, and a CRC 458. In certain configurations, the data packet 450 may not include the CRC 458.

In some aspects, the access address 454 may set the address of a link layer (such as the link layer 370) connection. For example, the access address 454 may include an address that indicates a type of logical link, including ACL, A2DP, eSCO, ISO, etc.

In certain configurations, the PDU 456 may include a header 462, a payload 464, and a MIC 468. The MIC includes information that may be used by to authenticate a data packet, for example, when the data packet is encrypted. In some aspects, the header 462 of the PDU 456 may include a plurality of fields, including at least an LLID, which may be a two-bit field.

In certain configurations, the payload 464 (excluding the MIC 468 and header 462) may include an unencrypted baseband packet. For example, the payload 464 may include a payload portion (excluding a MIC and payload header) of an unencrypted baseband ACL-U packet.

Figure 5:
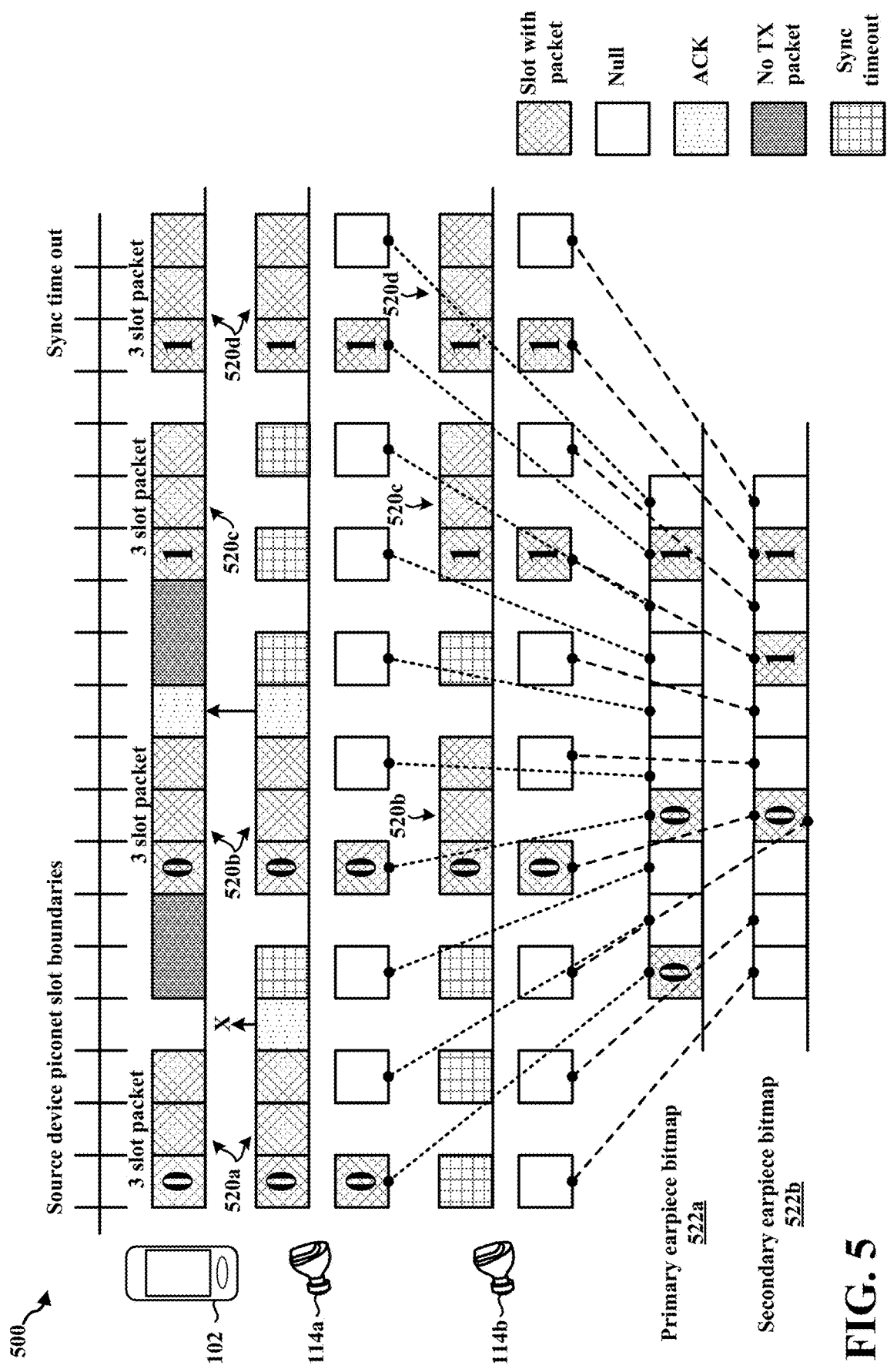
FIG. 5 is a diagram illustrating a short-range wireless communications system.

FIG. 5 illustrates an example of generation of bitmaps in a wireless communications system 500. Referring to FIG. 1, the wireless communications system 500 may include the source device 102, which may transmit the set of packets 120, and may include the headset 112, which may include the primary earpiece 114a and the secondary earpiece 114b.

In one configuration, referring to FIG. 4A, the source device 102 may transmit a BT and/or BR/EDR packet 400, which may include a MIC 426 appended to a payload 424 and a CRC 414 appended to a PDU 412 that includes both the payload 424 and the MIC 426. The PDU 412 may include an L2CAP PDU. In another configuration, referring to FIG. 4B, the source device 102 may transmit a BLE packet 450, which may include a MIC 468 appended to a payload 464 and a CRC 458 appended to a PDU 456 that includes both the payload 464 and the MIC 468. The PDU 456 may include an L2CAP PDU.

The set of packets 120 may include a set of three-slot packets transmitted by the source device 102. The source device 102 may transmit a first packet 520a, which may correspond to an SEQN of 0. The primary earpiece 114a may receive a first packet 520a (e.g., of the set of packets 120), and may transmit an ACK in response to the first packet 520a. However, the ACK may not be received by the source device 102 and, therefore, the source device 102 may transmit a second packet 520b, which may be a retransmission of the first packet 520a. When the second packet 520b is a retransmission of the first packet 520a, the second packet 520b may also correspond to an SEQN of 0. The primary earpiece 114a may also receive the second packet 520b, and may transmit an ACK in response to reception of the second packet 520b. The source device 102 may receive the ACK corresponding to the second packet 520b and, therefore, may transmit the next consecutive packet, which may be the third packet 520c corresponding to an SEQN of 1. However, the primary earpiece 114a may not receive the third packet 520c, such as due to synchronization timeout. Because the primary earpiece 114a may not transmit an ACK in response to the third packet 520c, the source device 102 may retransmit the third packet 520c as the fourth packet 520d, which may also correspond to the SEQN of 1 because the fourth packet 520d is a retransmission of the third packet 520c.

Based on the reception of the first packet 520a, the second packet 520b, and the fourth packet 520d, the primary earpiece 114a may generate a first bitmap 522a. The primary earpiece 114a may generate the first bitmap 522a to reflect reception of the aforementioned first packet 520a, second packet 520b, and fourth packet 520d. The primary earpiece 114a may generate the first bitmap 522a to include a set of NULLs between each of the bits indicating reception of the first packet 520a, the second packet 520b, and the fourth packet 520d. For example, each of the set of NULLs may indicate a synchronization timeout, an idle slot, an error (e.g., MIC or CRC error), a poll/NULL reception, etc.

The secondary earpiece 114b may not receive the first packet 520a (e.g., due to synchronization timeout), but may receive the retransmission of the first packet 520a, which may be the second packet 520b corresponding to the SEQN of 0. Further, the secondary earpiece 114b may successfully receive both the third packet 520c and the fourth packet 520d.

Based on the reception of the second packet 520b, the third packet 520c, and the fourth packet 520d, the secondary earpiece 114b may generate a second bitmap 522b. The secondary earpiece 114b may generate the second bitmap 522b to reflect reception of the aforementioned second packet 520b, third packet 520c, and fourth packet 520d. The secondary earpiece 114b may generate the second bitmap 522b to include a set of NULLs between each of the bits indicating reception of the second packet 520b, the third packet 520c, and the fourth packet 520d. For example, each of the set of NULLs may indicate a synchronization timeout, an idle slot, an error (e.g., MIC or CRC error), a poll/NULL reception, etc.

The primary earpiece 114a and/or the secondary earpiece 114b may identify a point (e.g., a point corresponding to a slot) on the first bitmap 522a (e.g., the bitmap generated by the primary earpiece 114a) at which the source device 102 may have transmitted a previous packet and is to transmit a next packet. For example, primary earpiece 114a and/or the secondary earpiece 114b may traverse the first bitmap 522a until such a point is identified. Illustratively, the identified point may occur at a boundary after the last NULL before the bit corresponding to the fourth packet 520d of the first bitmap 522a.

Thus, both the primary earpiece 114a and the secondary earpiece 114b may respectively store at least one first bitmap 522a and at least one second bitmap 522b. Each of the first bitmap 522a and the second bitmap 522b may correspond to every slot pair (e.g., of the piconet involving the source device 102 and the primary earpiece 114a or the secondary earpiece 114b).

Each of the first bitmap 522a and the second bitmap 522b may indicate at least one of the following three options: (1) SEQN=0 is received (with no header errors and no CRC errors; potentially includes MIC errors); (2) SEQN=1 is received (with no header errors and no CRC errors; potentially includes MIC errors); (3) NULL, which indicates nothing is received (potentially indicates the respective primary earpiece 114a or secondary earpiece 114b did not have an opportunity to open its receiver, synchronization timeout, and/or packet received with header error and/or CRC error and may or may not have MIC error). For the preceding three options to account for every slot pair, a 2-bit bitmap may be sufficient (although other sizes are possible).

In some configurations, at least one of the first bitmap 522a and/or the second bitmap 522b may be extended. Extension of the first bitmap 522a and/or the second bitmap 522b may allow the recombination of the packets 120 to reconstruct a PDU, such as a host-level data unit (e.g., an L2CAP PDU). In order to reconstruct a PDU (e.g., an L2CAP PDU), the one of the primary earpiece 114a and/or the secondary earpiece 114b that is reconstructing the PDU may be informed of the start/continue information of the corresponding baseband packet. The start/continue information may be present in a two-bit logical link identifier (LLID) that may be included in the header of a payload. LLID information may be available for received packets of the packets 120, but may be unavailable for missed, lost, and/or dropped packets of the packets 120, for example, because a packet relayed by the primary earpiece 114a to the secondary earpiece 114b may include the payload of the missed packet but may not include at least a portion of the other packet contents, such as the LLID of the missed packet. Other information (apart from the payload) may also be included in a relay packet itself, for example, including information at a predefined location within the payload, at a predefined location in the packet header, and/or at a predefined location in the payload header. In some configurations, the primary earpiece 114a may relay a packet from the source device 102 to the secondary earpiece 114b over the other communications link 118 without modification—e.g., the payload size and packet size supported on the communications link 116 between the source device 102 and the primary earpiece 114a may correspond (e.g., match) the payload size and packet size supported on the other communications link 118 between the primary earpiece 114a and the secondary earpiece 114b.

Accordingly, a wireless device (e.g., the headset 112) may benefit from an extension of a bitmap to include at least a portion of other packet contents of a missed packet that is relayed between one earpiece of the wireless device (e.g., the primary earpiece 114a) and another earpiece of the wireless device (e.g., the secondary earpiece 114b). For example, a bitmap may be extended to include at least information indicating an LLID of a missed packet. By including at least a portion of the other information (e.g., LLID information) in an extended bitmap, the relay of control packets (e.g., control packets having a separate LLID) may be reduced or eliminated and/or the relay of empty packets in lieu of control packets may be reduced or eliminated.

According to one configuration, a relay protocol (e.g., as described herein) may provide LLID information of a missed packet apart from relaying the payload of the missed packet by including some metadata while relaying. However, this may increase the latency experienced by at least one of the primary earpiece 114a and/or the secondary earpiece 114b. For example, if a full-length 2-DH5 packet relay is to include the metadata octets, then the information can flow in two baseband packets rather than one packet.

At least one of the first bitmap 522a and/or the second bitmap 522b may uniquely mark each slot pair according to the following TABLE 1.

TABLE 1

| SEQN | LLID | Additional Information (not included in bitmap) |
| --- | --- | --- |
| 0 | 01 | With no header error and CRC error and MIC error if MIC is present |
| 0 | 10 | With no header error and CRC error and MIC error if MIC is present |
| 0 | 11 | With no header error and CRC error and MIC error if MIC is present |
| 1 | 01 | With no header error and CRC error and MIC error if MIC is present |
| 1 | 10 | With no header error and CRC error and MIC error if MIC is present |
| 1 | 11 | With no header error and CRC error and MIC error if MIC is present |
| NULL | | Nothing is received |

The NULL entry of TABLE 1, in which nothing is received in the slot pair, may indicate that the primary earpiece 114a (if included in the first bitmap 522a) or the secondary earpiece 114b (if included in the second bitmap 522b) did not have an opportunity to open its receiver, may indicate a synchronization timeout, may indicate that the packet was received with at least one of a header error, a CRC error, and/or a MIC error, or may indicate a packet without any payload (e.g., poll/NULL packet). For packets with header error control (HEC) and CRC pass but with MIC error, the secondary earpiece 114b may or may not mark such packets using one of the first 6 bitmap values above (that is, one of the entries of TABLE 1 excluding the NULL entry). If the secondary earpiece 114b does not mark a packet with HEC and CRC pass and MIC error with one of the first 6 entries of TABLE 1, then the secondary earpiece 114b may mark such a packet with the NULL entry (that is, the seventh bitmap value supra). In order to mark all of the 7 entries of TABLE 1, a 3-bit bitmap for each slot pair may be used—e.g., 3 bits to mark each of the transmission slots of the source device 102.

As packets may be fragmented when transmitted over the air, the LLID may indicate the type of fragment. For example, start fragments of a packet may be indicated with an LLID of "10" and continuation fragments may be indicated with an LLID of "01." Packets that are not fragmented may use the LLID of "10" and may not be associated with any continuation fragments. Control fragments, however, may be indicated as "11."

Figure 6:
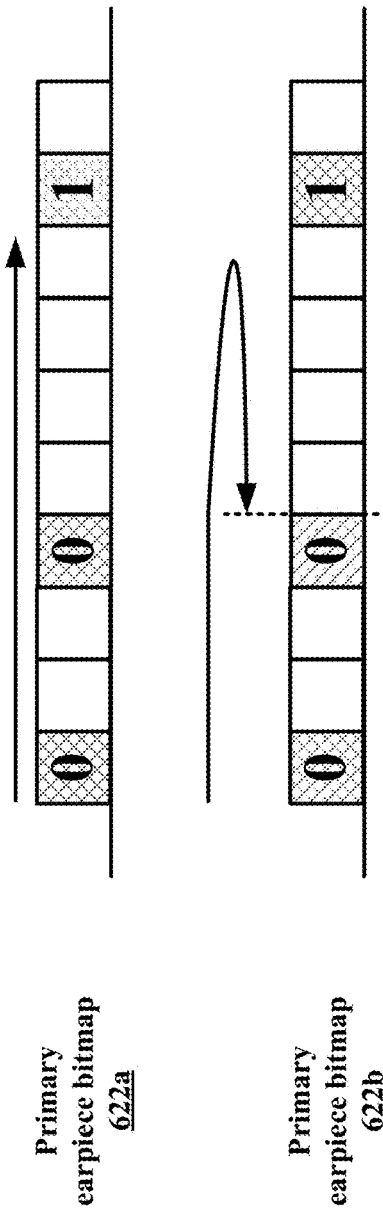
FIG. 6 is a diagram of bitmaps.

Referring to FIG. 6, a diagram 600 shows example bitmaps 622a, 622b. The primary earpiece 114a and/or the secondary earpiece 114b may traverse back to the end of a set of NULLs following reception of a packet. For example, the source device 102 may have started transmitting the next packet earlier, and the primary earpiece 114a may have received the next packet through a retransmission. After traversing back to the end of the NULLs following reception of a packet, the primary earpiece 114a and/or the secondary earpiece 114b may identify a point at which the source device 102 last transmitted a previous packet. If the secondary earpiece 114b has not received the previous packet at this point, then the secondary earpiece 114b may have missed the previous packet.

Figure 7:
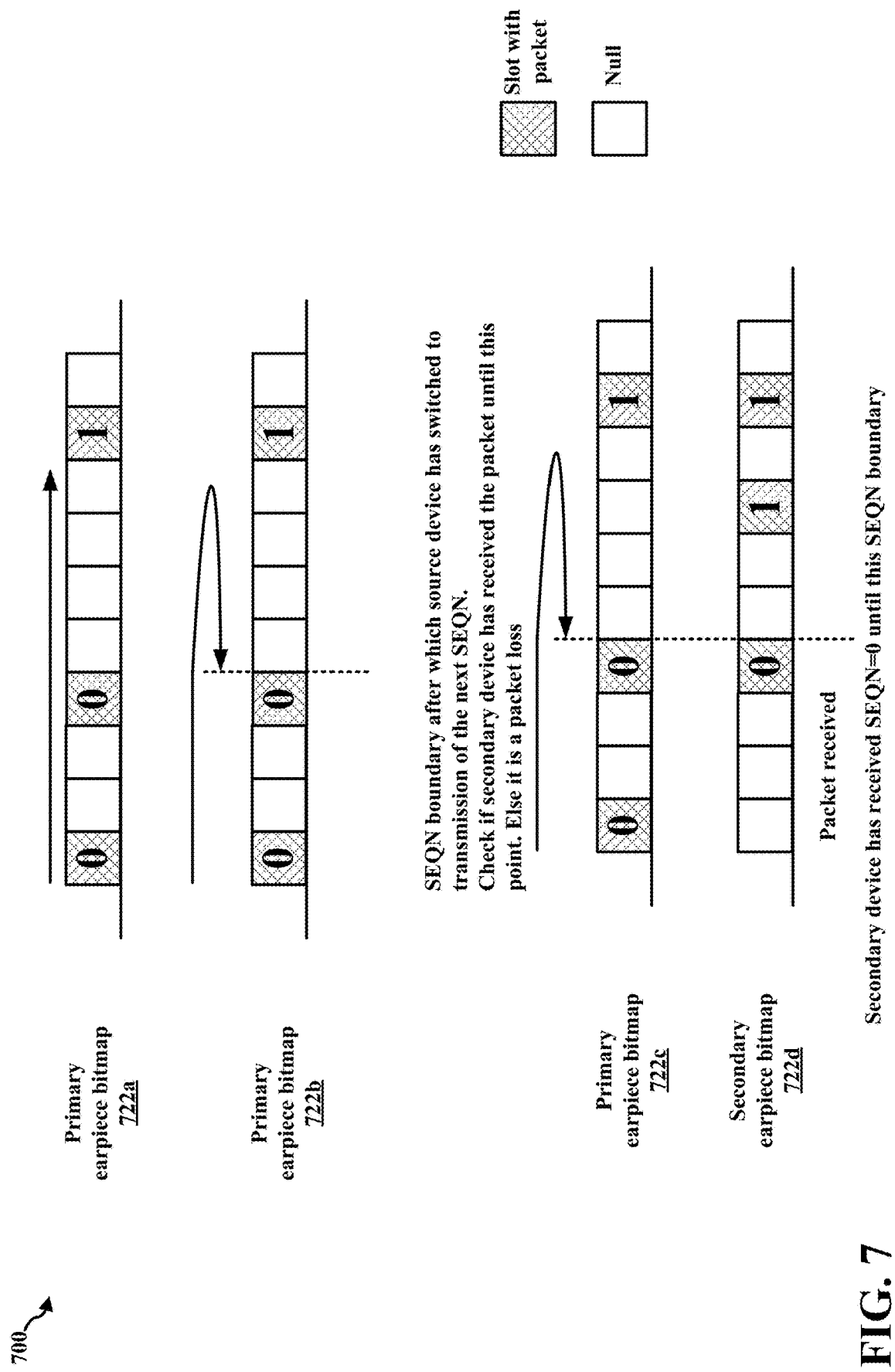
FIG. 7 is a diagram of bitmaps.

Referring to FIG. 7, a diagram 700 shows example bitmaps 622a, 622b, 622c, 622d. The place of the corresponding slots of a bitmap 622d generated by the secondary earpiece 114b is shown. In this example, the secondary earpiece 114b has received a set of packets having SEQN equal to 0 until the corresponding SEQN boundary.

Figure 8:
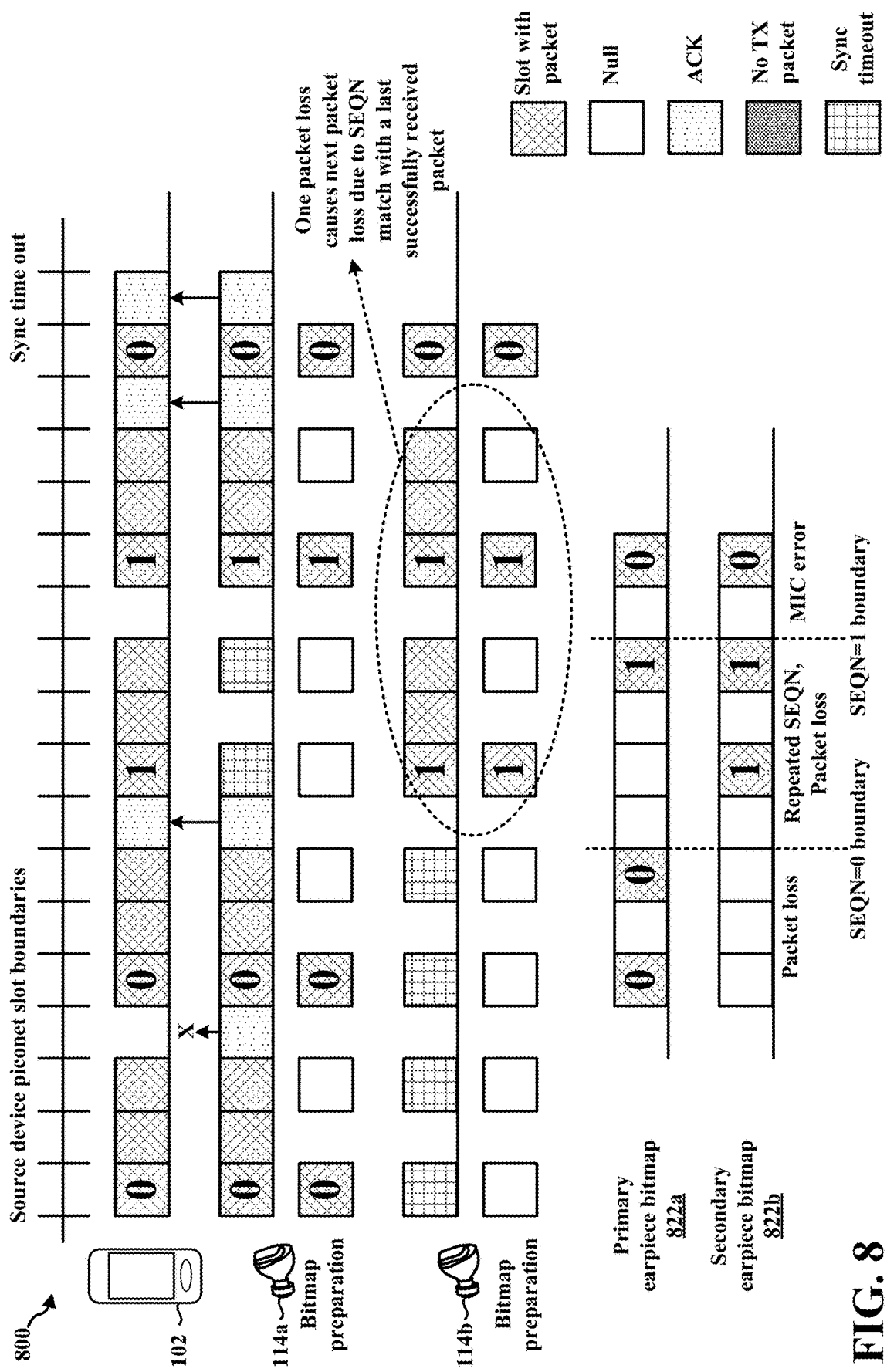
FIG. 8 is a diagram illustrating a short-range wireless communications system.

Referring to FIG. 8, a diagram 800 shows example bitmaps 822a, 822b. In this example, the secondary earpiece 114b may have missed one packet of the set of packets 120. Because the secondary earpiece 114b missed this one packet, the secondary earpiece 114b may miss the next packet due to the SEQN bit (e.g., SEQN mismatch between expected packet and actually received packet). That is, when the secondary earpiece 114b misses a first packet, the secondary earpiece 114b may miss the next consecutive packet due to MIC error. For example, the secondary earpiece 114b may attempt MIC validation on the next consecutive packet using the SEQN corresponding to the missed first packet (e.g., because the secondary earpiece 114b may be unaware that the secondary earpiece 114b has missed the first packet and the secondary earpiece does not increment the packet counter of the secondary earpiece 114b by 2).

Figure 9:
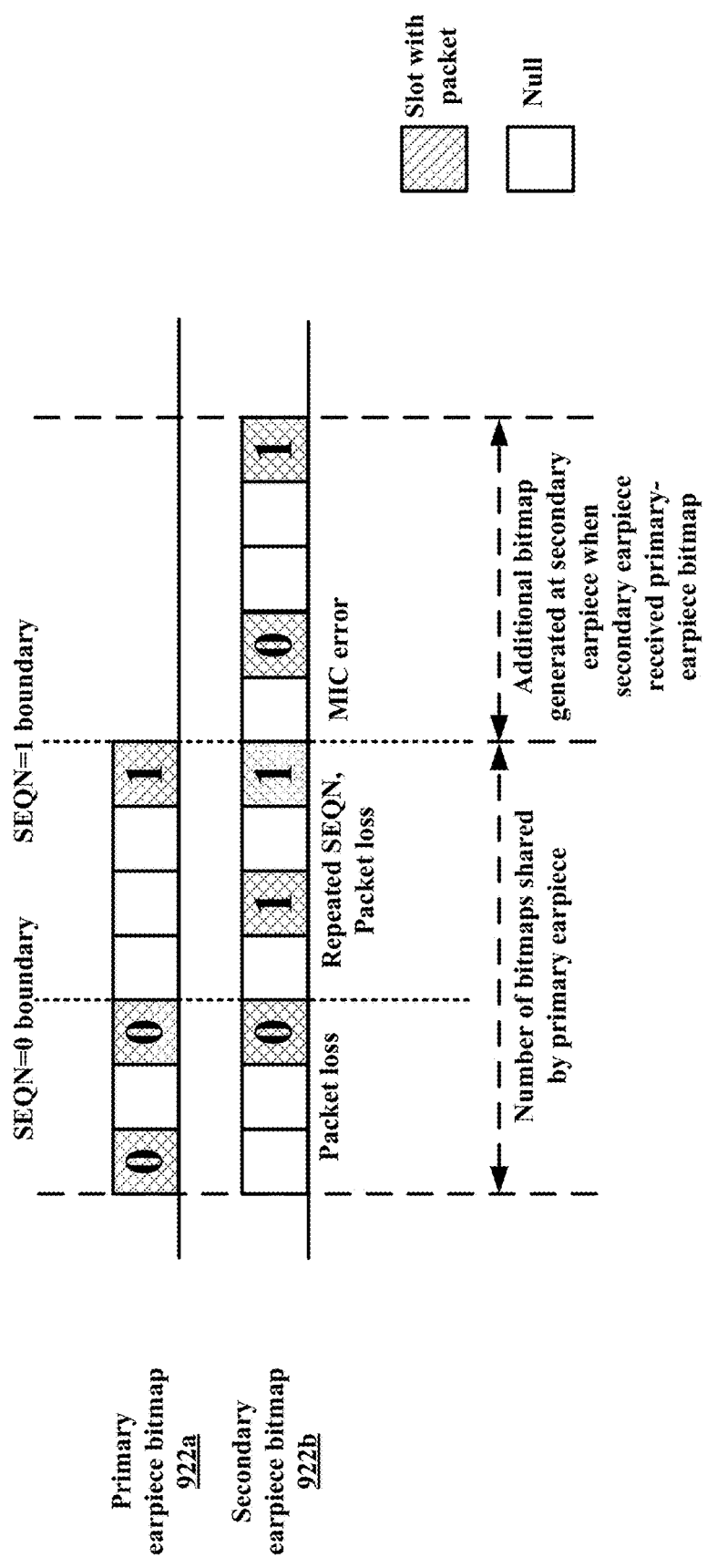
FIG. 9 is a diagram of bitmaps.

Referring to FIG. 9, a diagram 900 shows example bitmaps 922a, 922b. The primary earpiece 114a and the secondary earpiece 114b may begin preparation of a first bitmap 922a and a second bitmap 922b, respectively. Because the bitmaps 922a, 922b from the primary earpiece 114a and the secondary earpiece 114b, respectively, are to be analyzed for the same slots, the primary earpiece 114a and the secondary earpiece 114b may respectively begin preparation of the first bitmap 922a and the second bitmap 922b from a slot that may be referred to as "slot-zero." In addition to slot-zero, the secondary earpiece 114b may obtain a packet counter for the slot. Accordingly, the primary earpiece 114a may share the present or current value of a piconet clock (e.g., piconet clock value of the source device 102), marking the present/current value of the piconet clock as slot-zero. At slot-zero, the primary earpiece 114a may begin preparation of the first bitmap 922a and, also at slot-zero, the secondary earpiece 114b may begin preparation of the second bitmap 922b. Further, the primary earpiece 114a may share, with the secondary earpiece 114b, the present/current packet counter value corresponding to the shared clock value.

Following generation of the first bitmap 922a, the primary earpiece 114a may share the first bitmap 922a with the secondary earpiece 114b (e.g., by transmitting the first bitmap 922a over the other communications link 118). The secondary earpiece 114b may then analyze the second bitmap 922b along with the first bitmap 922a, shared by the primary earpiece 114a. In some aspects, when the secondary earpiece 114b receives the first bitmap 922a from the primary earpiece 114a, the second bitmap 922b may be relatively larger than the first bitmap 922a. Therefore, the secondary earpiece 114b may analyze the second bitmap 922b for the number of slots of the first bitmap 922a and/or the secondary earpiece 114b may analyze the first bitmap 922a and second bitmap 922b at the intersection of both the first bitmap 922a and the second bitmap 922b.

The secondary earpiece 114b may determine a relay list (containing packet counters) by identifying missing packets based on analysis of the first bitmap 922a and the second bitmap 922b. The relay list may include a list of packets that the secondary earpiece 114b determines that the secondary earpiece 114b should obtain. The secondary earpiece 114b may determine the packets with MIC errors, and recover those packets using the corrected packet counter, which may be provided to the secondary earpiece 114b by the primary earpiece 114a along with the relay list. For example, when there is an actual MIC error for a packet, which occurs after the corrected packet counter, the secondary earpiece 114b may include the packet having the MIC error in the relay list. However, including, in the relay list, packets that the secondary earpiece 114b has received but have MIC errors may be optional and may reduce the number of relays between the primary earpiece 114a and the secondary earpiece 114b. The secondary earpiece 114b may receive packets for which the packet counter may be correct but still have MIC errors. The secondary earpiece 114b may address such packets according to one or more approaches—for example, the secondary earpiece 114b may have a parallel 1-bit bitmap that indicates if a packet has a MIC error. After the analysis of the first bitmap 922a and the second bitmap 922b, the secondary earpiece 114b may request that the primary earpiece 114a relay a set of missed and/or erroneous packets, which may be indicated in the relay list.

Figure 10:
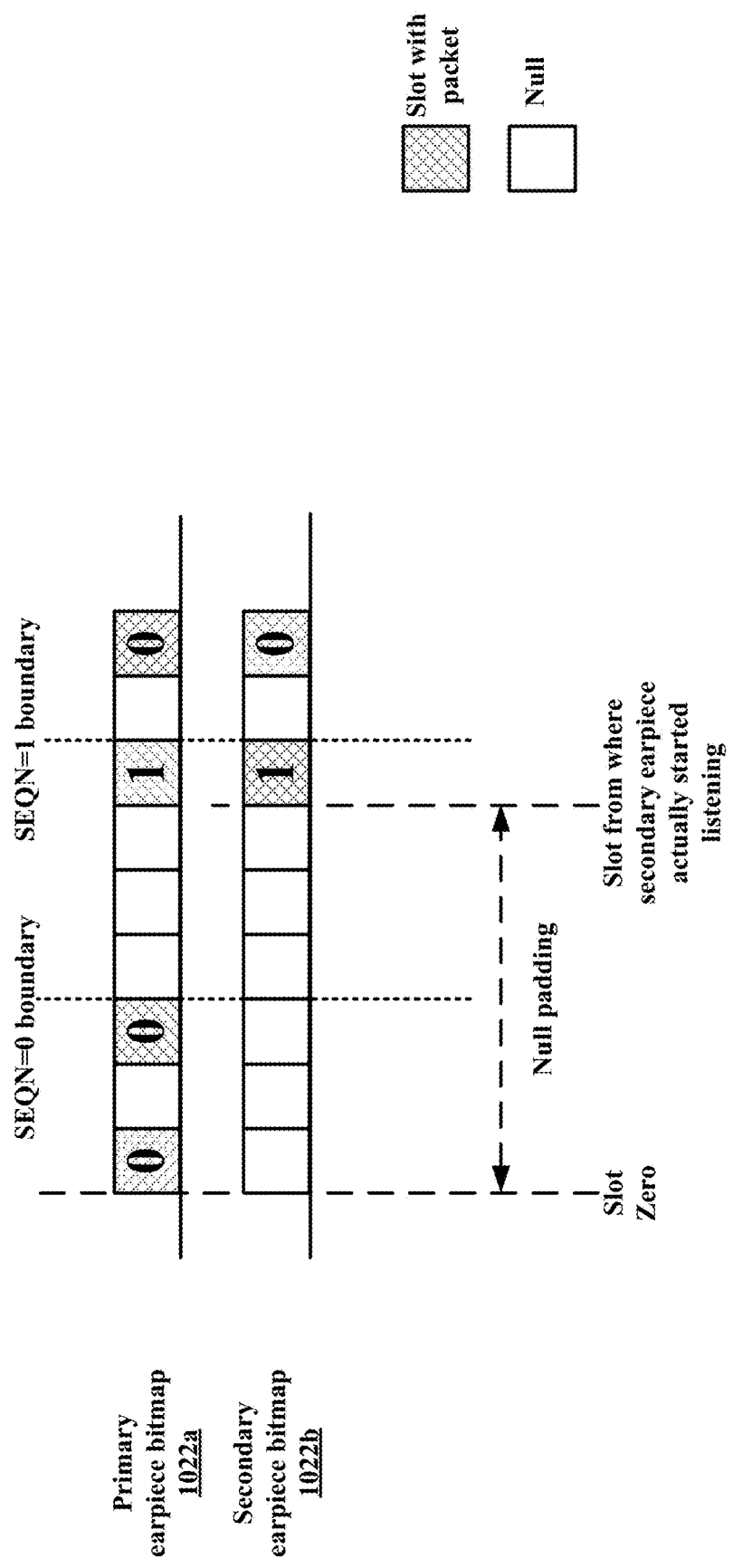
FIG. 10 is a diagram of bitmaps.

Referring to FIG. 10, a diagram 1000 shows example bitmaps 1022a, 1022b. When the primary earpiece 114a initially shares the first bitmap 1022a (generated by the primary earpiece 114a), the secondary earpiece 114b may have begun preparing the second bitmap 1022b a few slots later than the primary earpiece 114a began preparing the first bitmap 1022a. Therefore, the secondary earpiece 114b may include NULL padding from slot-zero until the slot where the secondary earpiece 114b actually began preparing the second bitmap 1022b. However, the packet counter of the secondary earpiece 114b may be stale and all the packets in the first synchronization between the primary earpiece 114a and the secondary earpiece 114b may fail MIC validation. Therefore, the secondary earpiece 114b may recover the packets failing MIC validation by removing the MIC errors using corrected packet counters.

Figure 11:
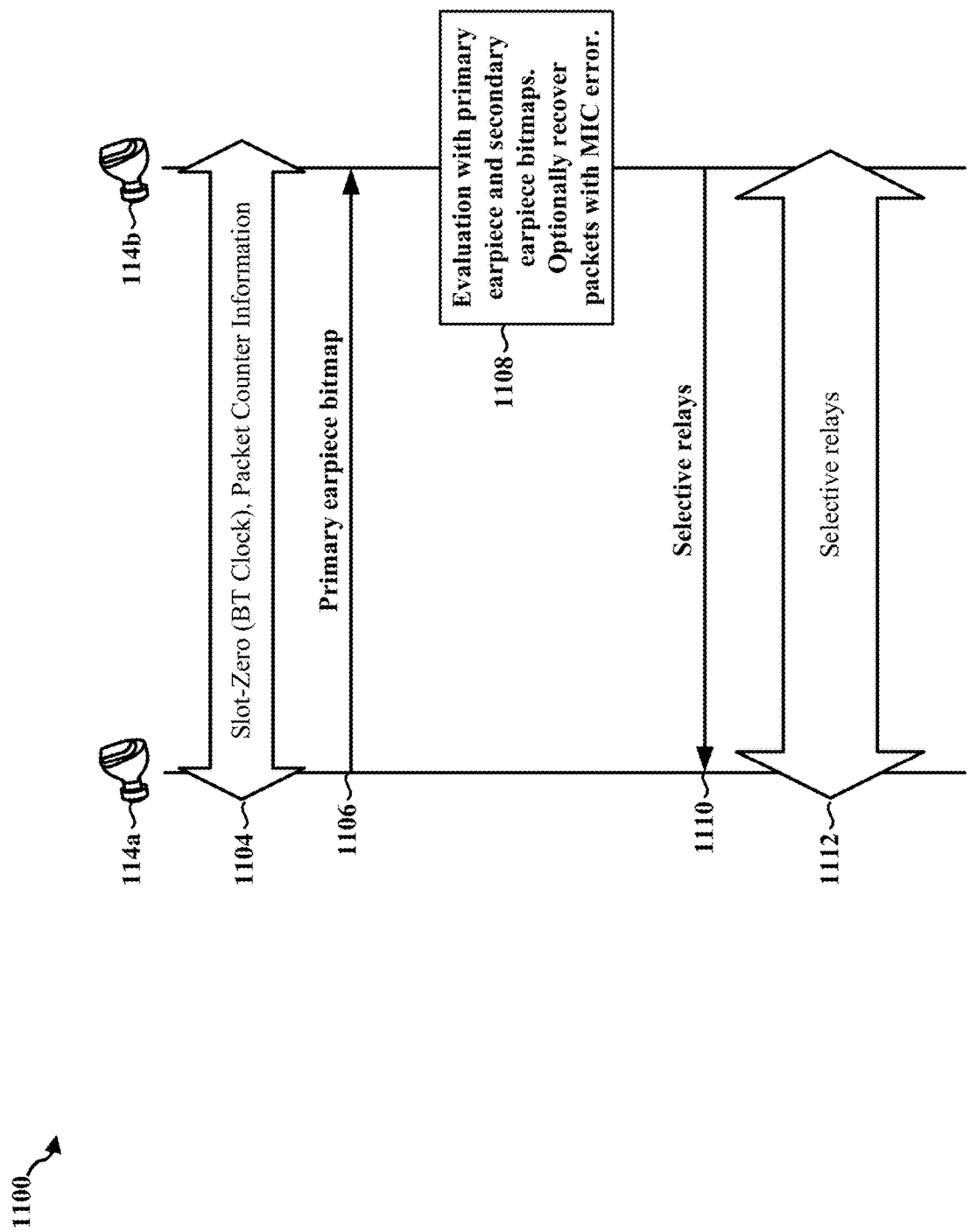
FIG. 11 is a call flow diagram of a method of selective relay.

Referring to FIG. 11, a call flow diagram shows a method 1100 of wireless communication between the primary earpiece 114a and the secondary earpiece 114b. At operation 1104, the primary earpiece 114a and the secondary earpiece 114b may share slot-zero (e.g., BT clock) and packet counter information. At operation 1106, the primary earpiece 114a may send a first bitmap (generated by the primary earpiece 114a) to the secondary earpiece 114b. The secondary earpiece 114b may receive the first bitmap and, based on the first bitmap, the secondary earpiece 114b may evaluate the first bitmap and a second bitmap (generated by the secondary earpiece 114b), for example, to generate a relay list (which may include corresponding packet counter information), as shown at operation 1108. Further to operation 1108, the secondary earpiece 114b may optionally recover packets with MIC errors (e.g., the secondary earpiece 114b may include a request for information for recovering packets with MIC errors in the relay list). At operation 1110, the secondary earpiece 114b may transmit a relay list to the primary earpiece 114a, and the relay list may indicate a selective list of packets and/or corresponding information (e.g., packet counter information) that the secondary earpiece 114b is attempting to obtain (e.g., due to packet loss) and/or recover (e.g., due to MIC errors). At operation 1112, the primary earpiece 114a and the secondary earpiece 114b may share selective relay of packets and/or corresponding information (e.g., packet counter information). For example, the primary earpiece 114a may selectively relay packets and/or corresponding information (e.g., packet counter information) with the secondary earpiece 114b based on the selective relay list sent to the primary earpiece 114a (as shown at operation 1110). The primary earpiece 114a may include additional information in a first bitmap (generated by the primary earpiece 114a) PDU. Such additional information may include a number of entries in the first bitmap. Further, such additional information may include packet counter information and/or SEQN information for a packet at the start of the first bitmap. Such additional information may also include a clock value (e.g., BT clock value) corresponding to the first bitmap generated by the primary earpiece 114a. Regarding the Link Manager Protocol (LMP), the primary earpiece 114a and/or the secondary earpiece 114b may refrain from retransmitting LMP information (e.g., LMP messages). LMP information may be processed at the primary earpiece 114a immediately, and the primary earpiece 114a may refrain from relaying LMP information.

If a packet is lost by the secondary earpiece 114b, then the next packet may be discarded due to having the same SEQN number. However, the secondary earpiece 114b may retain the next packet and check for MIC validation. If there is a MIC error, then this next packet may be a new packet or a retransmission packet, and the secondary earpiece 114b may recover this new packet with a MIC recovery process (potentially with relayed information from the primary earpiece 114a).

If a packet is lost with a CRC error, then the secondary earpiece 114b may store the SEQN number of the lost packet. If the next packet received by the secondary earpiece 114b has a different SEQN number than the stored SEQN number, then the secondary earpiece 114b may discard this next packet based on its having the same SEQN as a previous successful reception. Alternatively, the secondary earpiece 114b may retain this next packet because the secondary earpiece 114b may recover this next packet using a recovery process (e.g., MIC recovery process).

In some configurations, a flushed packet may be received by at least one of the primary earpiece 114a and/or the secondary earpiece 114b. A packet that is received by one of the primary earpiece 114a or the secondary earpiece 114b but is flushed before the other one of the primary earpiece 114a or the secondary earpiece 114b receives it can be handled with at least one approach of the following approaches. In a first approach, the one of the primary earpiece 114a or the secondary earpiece 114b that receives the flushed packet may relay the flushed packet to the other of the primary earpiece 114a or the secondary earpiece 114b. In a second approach, if the primary earpiece 114a receives the flushed packet but the secondary earpiece 114b does not, then the primary earpiece 114a may relay the flushed packet to the secondary earpiece 114b; otherwise, the secondary earpiece 114b may also flush the flushed packet. In a third approach, the one of the primary earpiece 114a or the secondary earpiece 114b that receives the flushed packet may also flush the flushed packet. According to the third approach, no additional control packet may be used for flushing; rather, the sharing of the first bitmap (generated by the primary earpiece 114a) and the second bitmap (generated by the secondary earpiece 114b) between the primary earpiece 114a and the secondary earpiece 114b may flush a packet. In some aspects, the primary earpiece 114a or the secondary earpiece 114b which received the flushed packet may flush the packet; the respective bitmap information corresponding to a flushed packet may be used for this entry rather than that of a successfully received packet. When respective bitmaps are exchanged, both the primary earpiece 114a and the secondary earpiece 114b are informed that both do not have the flushed packet based on the respective bitmaps.

In one configuration (e.g., both for a flushed packet received at one of the primary earpiece 114a or the secondary earpiece 114b or with no flushed packet), the secondary earpiece 114b may share the second bitmap (generated by the secondary earpiece 114b) with the primary earpiece 114a. In this way, the primary earpiece 114a may start using the initial PDUs which have been correctly received at the secondary earpiece 114b until the secondary earpiece 114b has a missing or erroneous PDU.

Referring to FIG. 12, one configuration 1200 of an extension of at least one of the aforementioned first and/or second bitmaps is illustrated. In some configurations, SEQN information may form the BASIS of determining missing packets. Other information (referred to as "Aux Information" or "Aux info") may provide additional information about missing packets. In one configuration, the Basis information and the Aux information may be different fields in the bitmap mark for each slot pair.

In one configuration, the determination of a missing packet using basis information may include two operations, which may be sequentially performed: (1) Determine the boundary of the switch of the source device 102 from transmission of one packet (e.g., SEQN=s) to the next packet (e.g., SEQN=s'); (2) Determine if the one packet (e.g., SEQN=s) has been received before the boundary. A basis bitmap for the preceding two operations may be prepared in at least one of at least two configurations. In a first configuration, both an initial transmission (i.e., not a retransmission) and a retransmission of an SEQN may be marked with a single bitmap, while the bitmap may be different for a different SEQN. The remaining cases of reception may be marked with any other bitmaps. In a second configuration, all transmissions (regardless of its SEQN) may be marked with a single bitmap and all retransmissions (regardless of any SEQN) may be marked with another bitmap. The remaining cases of reception may be marked with any other of the same or different bitmaps.

In some configurations, header information (e.g., L2CAP header information) may be appended in a first bitmap (generated by the primary earpiece 114a) and/or a second bitmap (generated by the secondary earpiece 114b). For example, the Aux information bits of a bitmap packet (e.g., including the first bitmap and/or including the second bitmap) may contain information such as the context identifier (CID) and/or length of every start packet (e.g., every L2CAP start packet). This information may inform the secondary earpiece 114b about a packet (e.g., L2CAP packet) that may be flushed and could not be relayed from the primary earpiece 114a to the secondary earpiece 114b (however, the primary earpiece 114a may rarely be unable to transmit a bitmap packet including a first bitmap to the secondary earpiece 114b). Accordingly, the secondary earpiece 114b may be informed about how many packets corresponding to a particular CID (e.g., A2DP) are missed.

After the secondary earpiece 114a obtains all the possible relay packets from the primary earpiece 114a, the secondary earpiece 114b may determine if any of the packets were flushed and could not be relayed. If a packet is flushed and could not be relayed, then the secondary earpiece 114b may determine information about the header (e.g., L2CAP header) of that packet from the first bitmap provided by the primary earpiece 114a. Such information may be encapsulated in an L2CAP packet (e.g., with a special CID already agreed upon between the controller and host), and will be sent to the host in the same order in which the actual packet would have been sent. Events may be unused here in some configurations because events may be delivered at different time(s) from data and the order may be changed. The host may read the special CID and, based on the length indicated in the packet, the host may determine how much data (e.g., audio data) may have been missed; accordingly, the host may adjust the time-to-play (TTP) of future packets.

Figure 13:
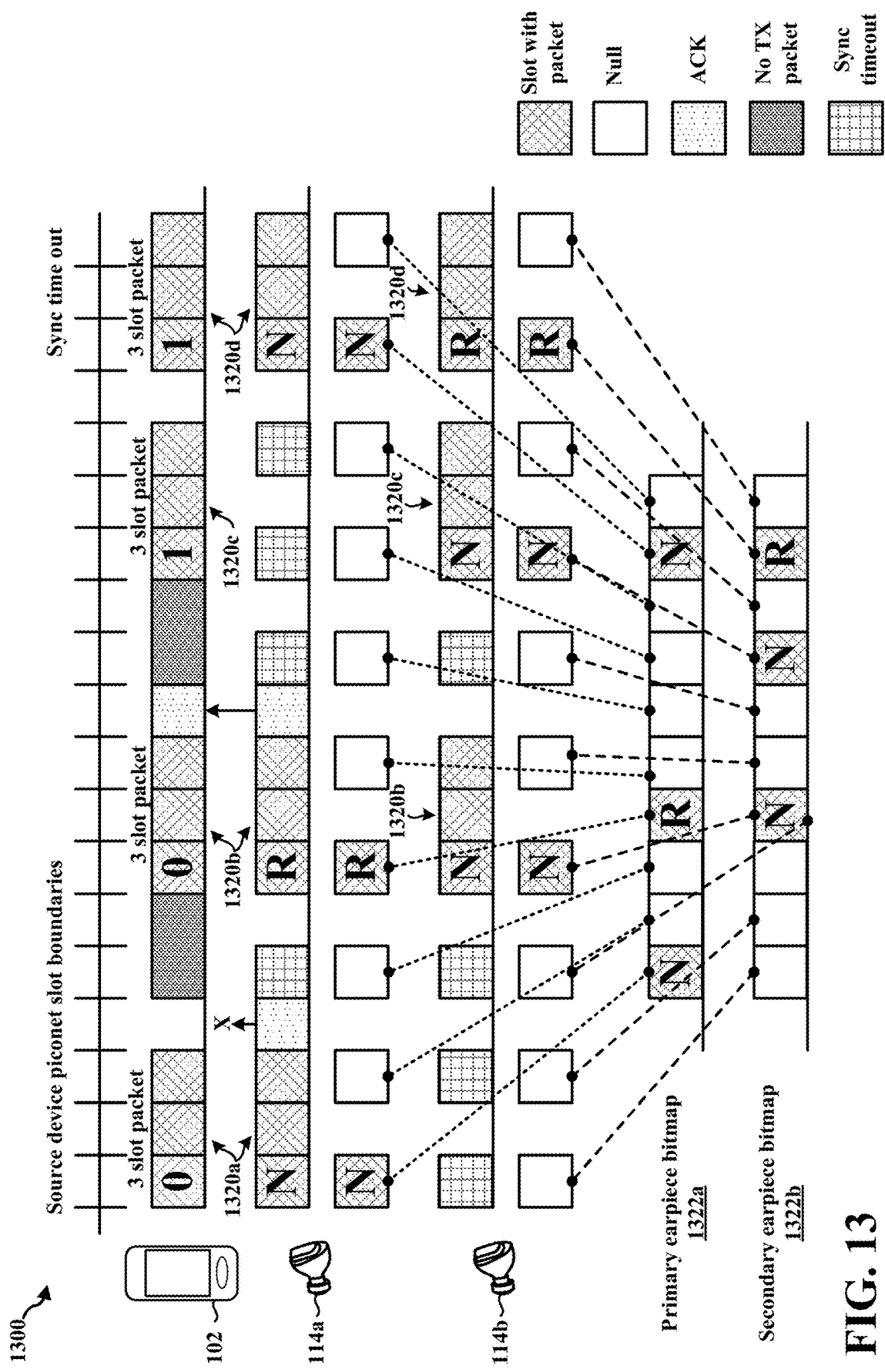
FIG. 13 is a diagram illustrating a short-range wireless communications system.

Referring to FIG. 13, an example of bitmap preparation 1300 may be illustrated. In one configuration, referring to FIG. 4A, the source device 102 may transmit a BT and/or BR/EDR packet 400, which may include a MIC 426 appended to a payload 424 and a CRC 414 appended to a PDU 412 that includes both the payload 424 and the MIC 426. The PDU 412 may include an L2CAP PDU. In another configuration, referring to FIG. 4B, the source device 102 may transmit a BLE packet 450, which may include a MIC 468 appended to a payload 464 and a CRC 458 appended to a PDU 456 that includes both the payload 464 and the MIC 468. The PDU 456 may include an L2CAP PDU.

The set of packets 120 may include a set of three-slot packets transmitted by the source device 102. The source device 102 may transmit a first packet 1320a, which may correspond to an SEQN of 0. The primary earpiece 114a may receive a first packet 1320a (e.g., of the set of packets 120), and may transmit an ACK in response to the first packet 1320a. However, the ACK may not be received by the source device 102 and, therefore, the source device 102 may transmit a second packet 1320b, which may be a retransmission of the first packet 1320a. When the second packet 1320b is a retransmission of the first packet 1320a, the second packet 1320b may also correspond to an SEQN of 0. The primary earpiece 114a may also receive the second packet 1320b, and may transmit an ACK in response to reception of the second packet 1320b. The source device 102 may receive the ACK corresponding to the second packet 1320b and, therefore, may transmit the next consecutive packet, which may be the third packet 1320c corresponding to an SEQN of 1. However, the primary earpiece 114a may not receive the third packet 1320c, such as due to synchronization timeout. Because the primary earpiece 114a may not transmit an ACK in response to the third packet 1320c, the source device 102 may retransmit the third packet 1320c as the fourth packet 1320d, which may also correspond to the SEQN of 1 because the fourth packet 1320d is a retransmission of the third packet 1320c.

Based on the reception of the first packet 1320a, the second packet 1320b, and the fourth packet 1320d, the primary earpiece 114a may generate a first bitmap 1322a. The primary earpiece 114a may generate the first bitmap 1322a to reflect reception of the aforementioned first packet 1320a, second packet 1320b, and fourth packet 1320d. The primary earpiece 114a may generate the first bitmap 1322a to include a set of NULLs between each of the bits indicating reception of the first packet 1320a, the second packet 1320b, and the fourth packet 1320d. For example, each of the set of NULLs may indicate a synchronization timeout, an idle slot, an error (e.g., MIC or CRC error), a poll/NULL reception, etc.

In generating the first bitmap 1322a, the primary earpiece 114a may mark each "new" packet (that is, each packet that is not received as a retransmission of another packet) with a first value (e.g., "N") and may mark each retransmission packet with a second value (e.g., "R"). For example, the primary earpiece 114a may mark the first packet 1320a with the first value (e.g., "N") in the first bitmap 1322a. The primary earpiece 114a may mark the second packet 1320b with the second value (e.g., "R") in the first bitmap 1322a. The primary earpiece 114a may mark the fourth packet 1320d with the first value (e.g., "N") in the first bitmap 1322a because the fourth packet 1320d is a new packet to the primary earpiece 114a even though the fourth packet 1320d is a retransmission of the third packet 1320c (because the third packet 1320c was not received by the primary earpiece 114a).

The secondary earpiece 114b may not receive the first packet 1320a (e.g., due to synchronization timeout), but may receive the retransmission of the first packet 1320a, which may be the second packet 1320b corresponding to the SEQN of 0. Further, the secondary earpiece 114b may successfully receive both the third packet 1320c and the fourth packet 1320d.

Based on the reception of the second packet 1320b, the third packet 1320c, and the fourth packet 1320d, the secondary earpiece 114b may generate a second bitmap 1322b. The secondary earpiece 114b may generate the second bitmap 1322b to reflect reception of the aforementioned second packet 1320b, third packet 1320c, and fourth packet 1320d. The secondary earpiece 114b may generate the second bitmap 1322b to include a set of NULLs between each of the bits indicating reception of the second packet 1320b, the third packet 1320c, and the fourth packet 1320d. For example, each of the set of NULLs may indicate a synchronization timeout, an idle slot, an error (e.g., MIC or CRC error), a poll/NULL reception, etc.

In generating the second bitmap 1322b, the secondary earpiece 114b may mark each "new" packet (that is, each packet that is not received as a retransmission of another packet) with a first value (e.g., "N") and may mark each retransmission packet with a second value (e.g., "R"). For example, the secondary earpiece 114b may mark the second packet 1320b with the first value (e.g., "N") in the second bitmap 1322b because the second packet 1320b is a new packet to the secondary earpiece 114b even though the second packet 1320b is a retransmission of the first packet 1320a (because the first packet 1320a was not received by the secondary earpiece 114b). The secondary earpiece 114b may mark the third packet 1320c with the first value (e.g., "N") in the second bitmap 1322b. The secondary earpiece 114b may mark the fourth packet 1320d with the second value (e.g., "R") in the second bitmap 1322b because the fourth packet 1320d is received by the secondary earpiece 114b as a retransmission of the third packet 1320c.

Figure 14:
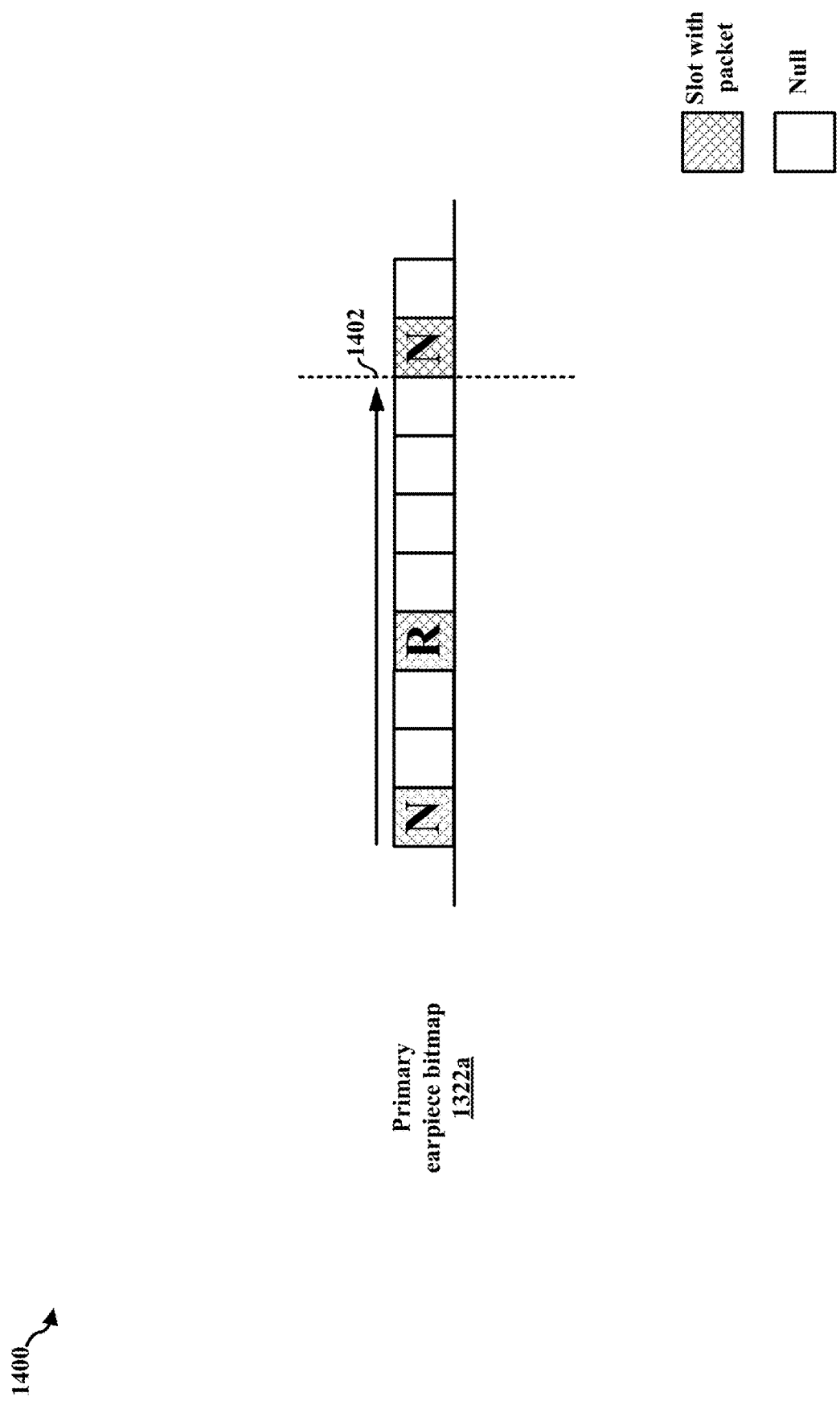
FIG. 14 is a diagram of bitmaps.

Referring to FIG. 14, a diagram 1400 illustrates an example of an operation for finding a first boundary 1402 on the first bitmap 1322a of FIG. 13, which may be generated by the primary earpiece 114a. The primary earpiece 114a and/or the secondary earpiece 114b may identify a point (e.g., a point corresponding to a slot) on the first bitmap 1322a (e.g., the bitmap generated by the primary earpiece 114a) at which the source device 102 may have transmitted a previous packet and is to transmit a next packet. For example, the primary earpiece 114a and/or the secondary earpiece 114b may traverse the first bitmap 1322a until such a point or boundary 1402 is identified. Illustratively, the identified point or boundary 1402 may occur at a boundary after the last NULL before the bit corresponding to the fourth packet 1320d of the first bitmap 1322a. For example, the primary earpiece 114a and/or the secondary earpiece 114b may traverse the first bitmap 1322a from one occurrence of the first value (e.g., "N") to the next consecutive occurrence of the first value (e.g., "N") in order to identify the first boundary 1402.

Figure 15:
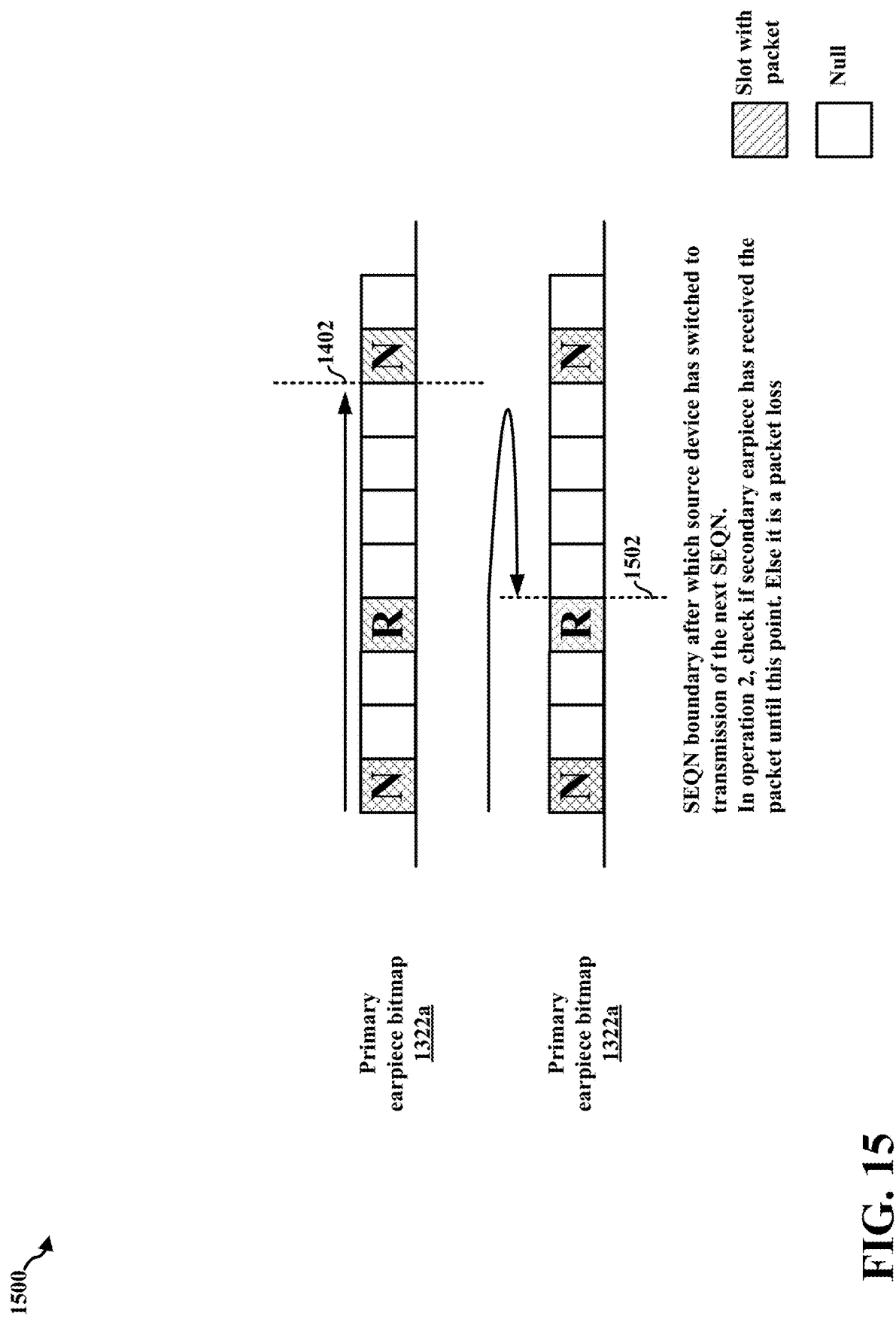
FIG. 15 is a diagram of bitmaps.

Referring to FIG. 15, a diagram 1500 illustrates an example of an operation for finding a boundary on the first bitmap 1322a of FIG. 13. Once the first boundary 1402 is identified, the primary earpiece 114a and/or the secondary earpiece 114b may work back until a bit corresponding to a first value (e.g., "N") or a second value (e.g., "R") is identified. For example, the source device 102 may have started transmitting a next packet earlier and the primary earpiece 114a may have received the next packet from a retransmission. After working back, the primary earpiece 114a and/or the secondary earpiece 114b may identify a second boundary 1502 at which the source device 102 last transmitted the packet. If the secondary earpiece 114b has not received the packet at this point or boundary 1502, then the secondary earpiece 114b may have missed the packet.

Figure 16:
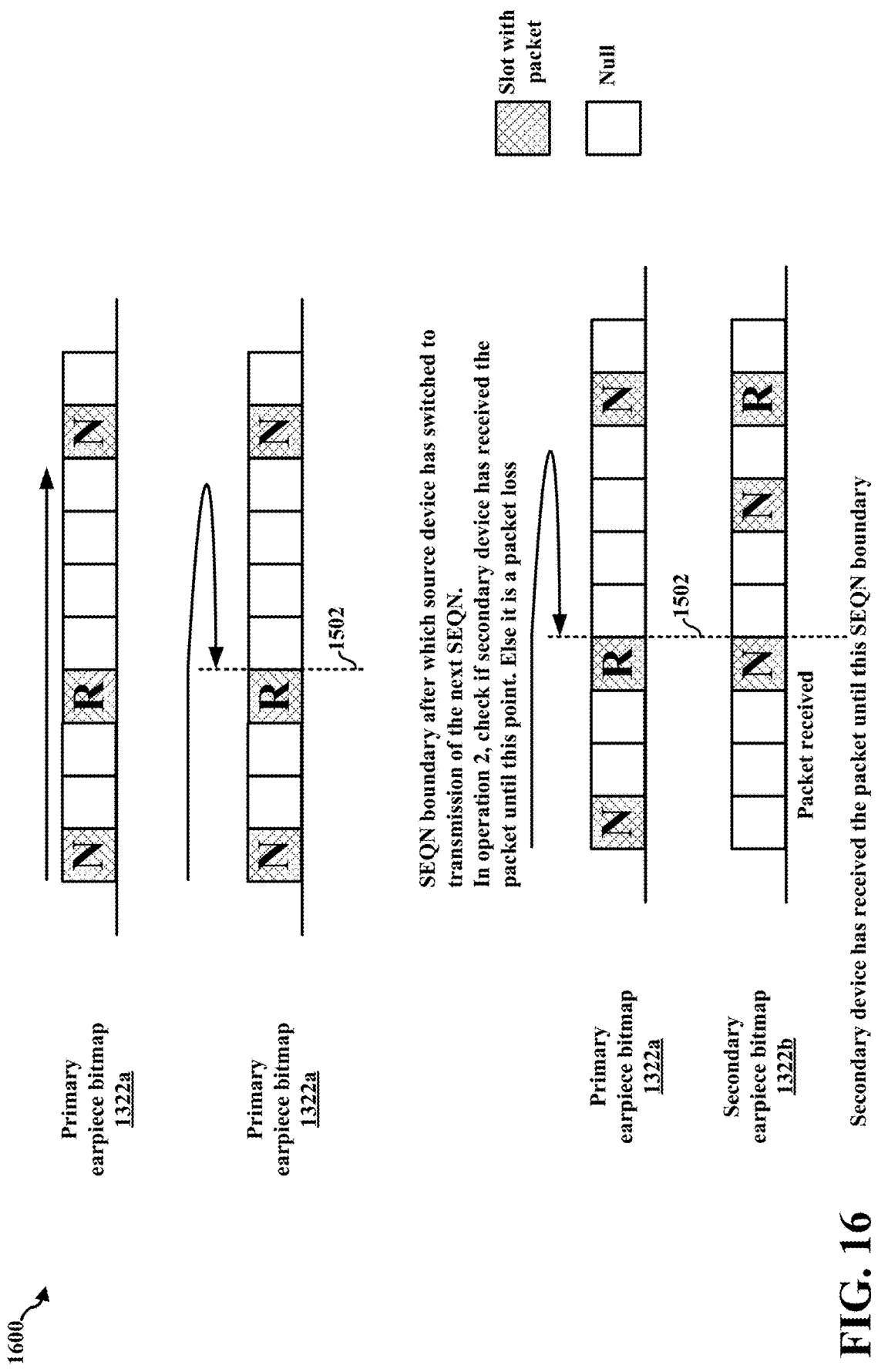
FIG. 16 is a diagram of bitmaps.

Referring to FIG. 16, a diagram 1600 illustrates an example of an operation for finding a boundary on the first bitmap 1322a and the second bitmap 1322b of FIG. 13. Once the second boundary 1502 is identified, the secondary earpiece 114b may determine whether or not the secondary earpiece 114b has received the packet at the second boundary 1502. For example, the secondary earpiece 114b may align the first bitmap 1322a and the second bitmap 1322b so that the slots are aligned. The secondary earpiece 114b may check up until the second boundary 1502 has received the packet. In this example, the secondary earpiece 114b has received the packet having SEQN=0.

In some configurations, there may be alternative options for the Basis information in the first bitmap 1322a and/or the second bitmap 1322b. For example, a 3-slot packet spans across 3 slots and, therefore, this packet may correspond to marking of two transmission slots of the source device 102 (in the case of 5 slots, the marking may be for 3 transmission slots of the source device 102). The first transmission slot may be marked with SEQN or the first value/second value (e.g., "N"/"R") depending on which configuration is used for Basis information. The remaining transmission slots may be marked with NULL or alternatively repeating the same mark as for the first transmission slot. The marking of the remaining transmission slots of the first transmission and retransmission may be different.

In some configurations, the end packet and start packet information may be simplified in the bitmaps 1322a, 1322b. For example, the primary earpiece 114a, while sending the first bitmap 1322a, may be configured to prevent the last bits in the first bitmap 1322a from corresponding to NULL. If NULL is allowed in the last bits of the first bitmap 1322a, then coordination may be involved between the current first bitmap 1322a and the next bitmap. This may be avoided by preventing NULL in the last bits so that the first bitmap 1322a shared by the primary earpiece 114a is independent of the next bitmaps shared by the primary earpiece 114a. If the last packet is missing for the secondary earpiece 114b, then the secondary earpiece 114b may receive a retransmission in the next bitmap; however, the secondary earpiece 114b may get the retransmission relayed. Therefore, while selecting the first packet bitmap from the next bitmap generated by the first earpiece 114a, the secondary earpiece 114b may ignore the preceding non-data bits (if any exist). Further, the secondary earpiece 114b may update the SEQN number when the last packet is recovered from the primary earpiece 114a.

Figure 17:
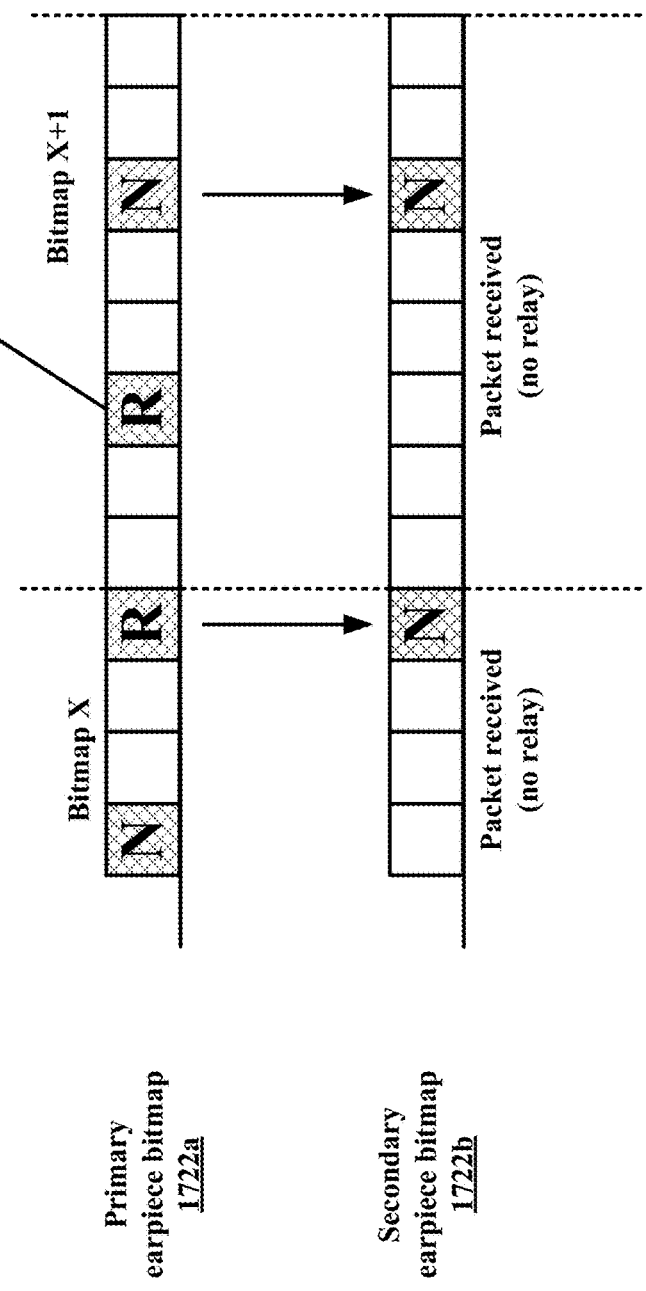
FIG. 17 is a diagram of bitmaps.

Referring to FIG. 17, a diagram 1700 illustrates an example of a first bitmap 1722a and a second bitmap 1722b. The first bitmap 1722a may be generated by the primary earpiece 114a, and the second bitmap 1722b may be generated by the secondary earpiece 114b. The secondary earpiece 114b may not request the selective relay of a packet marked with the second value (e.g., "R") if the secondary earpiece 114b has already received the packet, even though the secondary earpiece 114b received the packet as a retransmission (but is marked with the first value "N" because the secondary earpiece 114b did not receive the initial transmission of the packet).

Figure 18:
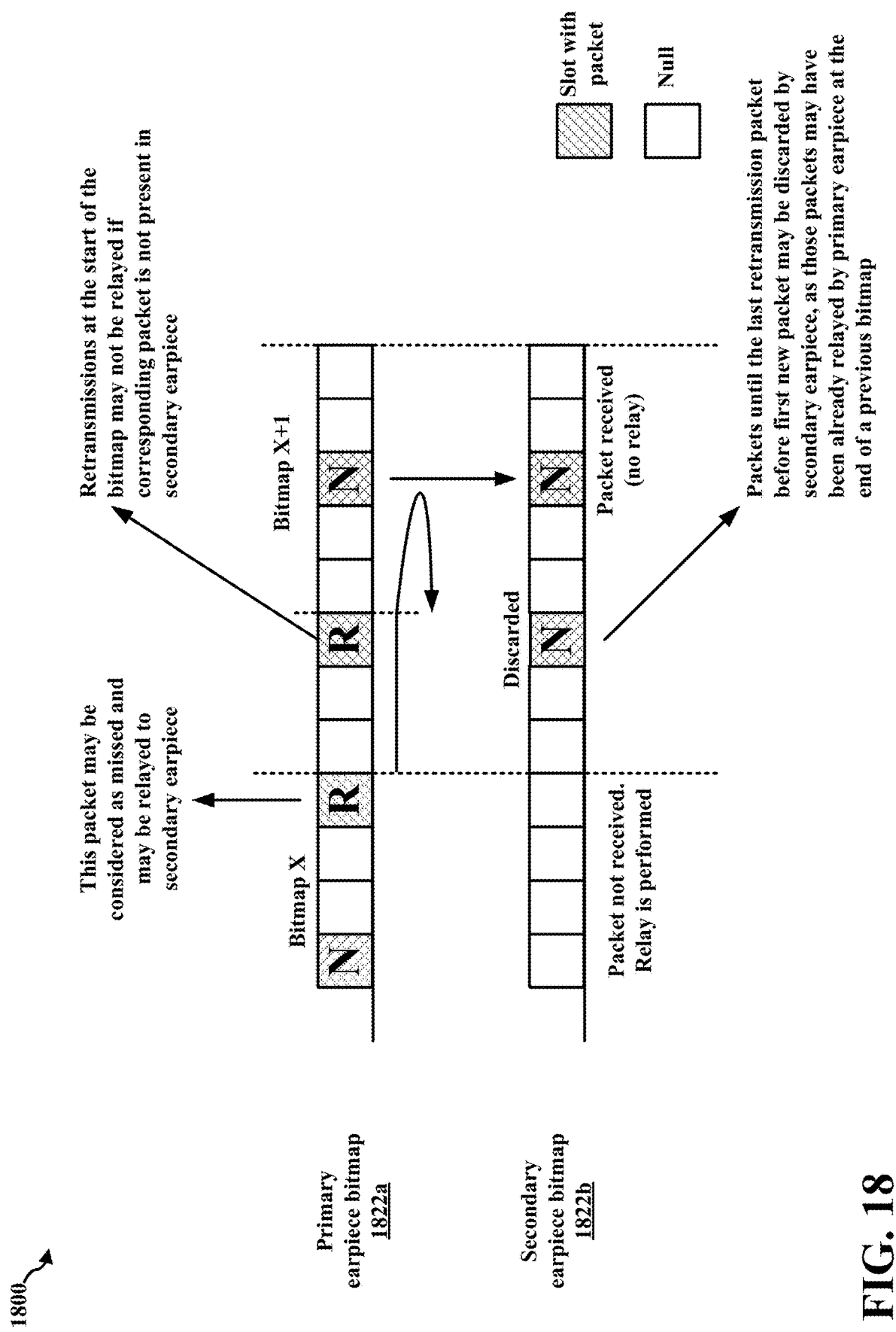
FIG. 18 is a diagram of bitmaps.

Referring to FIG. 18, a diagram 1800 illustrates an example of a first bitmap 1822a and a second bitmap 1822b. The first bitmap 1822a may be generated by the primary earpiece 114a, and the second bitmap 1822b may be generated by the secondary earpiece 114b. In sharing bitmap X of the first bitmap 1822a, the secondary earpiece 114b may request selective relay of one packet because the secondary earpiece 114b did not receive the packet corresponding to bitmap N of the first bitmap 1822a. In sharing bitmap X+1 of the first bitmap 1822a, the primary earpiece 114a may not selectively relay retransmissions at the start of the bitmap X+1 of the first bitmap 1822a if the corresponding packet is not present in the secondary earpiece 114b, as indicated in sharing the bitmap X+1 of the second bitmap 1822b. Packets until the last retransmission packet before the first new packet may be discarded by the secondary earpiece 114b, because those packets may have already been relayed by the primary earpiece 114a at the end of the previous bitmap X of the first bitmap 1822a.

Figure 19:
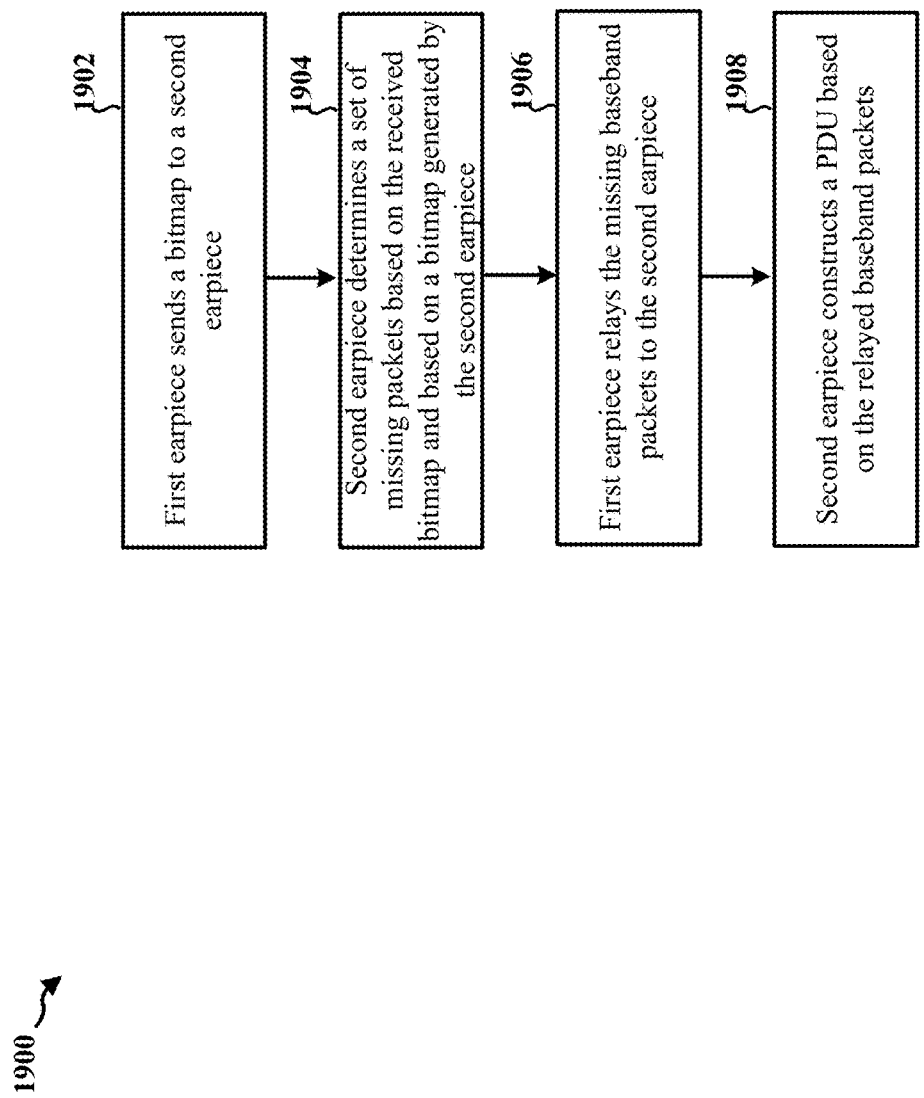
FIG. 19 is a flowchart of a method of selective relay of packets.

Referring to FIG. 19, a flow diagram shows a method 1900 of constructing a phone baseband fragment from multiple relay packets from the primary earpiece 114a to the secondary earpiece 114b. A PDU (e.g., an L2CAP PDU) may be sent in one or multiple baseband packets (also termed as fragments). As used herein, S may be the first fragment sent over the air (e.g., starting fragment). S may be identified by an LLID=10. C may be the next fragment(s) sent over the air (continue fragment(s)). C may be identified by LLID=01. LLID=11 may be used for the control packets (e.g., packets including LMP information). There may be no start/continue for LMP packets, as LMP packets may be sent as a single packet. The link between the primary earpiece 114a and the secondary earpiece 114b may be referred to as a "buddy" link.

By way of example, the source device 102 may have transmitted 5 packets for which the primary earpiece 114a and the secondary earpiece 114b have prepared respective bitmaps. In this example, packet 1 may have a payload size of 600, packet 2 may have a payload size of 895, packet 3 may have a payload size of 700, packet 4 may have a payload size of 600, and packet 5 may have a payload size of 500. Packet 1 may be an S fragment, packet 2 may be an S fragment, packet 3 may be an S fragment, packet 4 may be a C fragment, and packet 5 may be an S fragment. If the secondary earpiece 114b has missed packets 2 and 4 and transmits a bitmap to the primary earpiece 114a indicating the same (e.g., using an extended bitmap described herein), the primary earpiece 114a may know that the secondary earpiece 114b has missed S fragment for packet 2 and a C fragment for packet 4. The primary earpiece 114a may relay the payloads of the missed packets 2 and 4 to the secondary earpiece 114b over the buddy link.

For the relay of the payload of packet 2, the primary earpiece 114a may transmit the payload of packet 2 in two packets (two fragments), for example, of 679 octets in the first fragment S and the remaining 216 octets in the next fragment C. The secondary earpiece 114b may combine these two fragments received over the buddy link, and may reconstruct the packet 2, which is the S fragment from the source device 102. For the relay of packet 4, the primary earpiece 114a may transmit the payload of packet 4 in a single baseband packet over the buddy link. Packet 4 is an S fragment over the buddy link, even though packet 4 corresponds to a C fragment from the source device 102. If an LMP packet (or control packet) has been missed by the secondary earpiece 114b, then the primary earpiece 114a and the secondary earpiece 114b may be unable to use the next packets after the LMP packet to play until at least one of the primary earpiece 114a and/or the secondary earpiece 114b get at least one of: the missed packet; an empty packet (packet with payload header only) in lieu of the missed LMP packet; and/or information that the missed packet is an LMP packet. So, when an earpiece 114a, 114b determines that a particular packet is missed (e.g., from the Basis information), using the extended bitmap, the earpiece 114a, 114 may correspondingly determine that the missed packet is an LMP packet. Therefore, both the primary earpiece 114a and the secondary earpiece 114b may have a common understanding that missed LMP packets at the secondary earpiece 114b may not necessarily be relayed when missed by the primary earpiece 114a (which handles the control packets).

With respect to relay between the primary earpiece 114a and the secondary earpiece 114b, the bitmap exchange PDU may include one of the following: (1) bitmap stream (e.g., field to be included); (2) clock value of the first bitmap; (3) packet counter number of the first packet (in case of AES-CCM encrypted link between the source device 102 and the primary earpiece 114a). There may be multiple options for the relay, including: (1) primary earpiece 114a shares its bitmap with secondary earpiece 114b, then secondary earpiece 114b figures out its own missing packets and requests primary earpiece to relay missing packets (or vice versa); (2) primary earpiece 114a shares its bitmap with secondary earpiece 114b, then secondary earpiece 114b figures out missing packets of primary earpiece 114a and relays those missing packets one by one (or vice versa); (3) before the start of relay both the primary earpiece 114a and the secondary earpiece 114b share their bitmaps with each other.

Both the primary earpiece 114a and the secondary earpiece 114b may share their bitmaps before relay. When an earpiece 114a/114b has sent out its own bitmap and, in response, has received the peer earpiece's 114b/114a bitmap or has received the peer earpiece's 114b/114a bitmap and has sent its own bitmap in response, the earpiece 114a/114b may start relaying packets missed by the peer earpiece 114b/114a. Bitmap exchange in both directions may uniquely determine the order of relay for the sender earpiece 114a/114b and the receiving earpiece 114b/114a, thereby reducing or eliminating the need for any metadata to map a relayed packet to the missed packet from the source device 102. From the unique relay order (based on common understanding between the earpieces 114a/114b), the receiving earpiece 114b/114a may determine whether the packet is packet 2 or packet 4. The relay may occur in context of the latest bitmap exchange. Therefore, before sending a bitmap PDU out, an earpiece 114a/114b may pause the relay data after sending or flushing, if any, relay packet's fragment in the retransmission queue. The bitmap PDU may contain the clock value corresponding to the first slot-pair mark in the bitmap stream. So, the relay happens in the context of the latest clock value of the sent and received bitmap PDU. There can be a timeout associated with bitmap PDU similar to LMP response timeout.

At operation 1902, a first earpiece (e.g., the primary earpiece 114a) may send a bitmap to a second earpiece (e.g., the secondary earpiece 114b). At operation 1904, the second earpiece may determine a set of missing packets based on the received bitmap and based on a bitmap generated by the second earpiece. For example, the second earpiece may compare the received bitmap with the generated bitmap, and the second earpiece may determine which entries are present in the received bitmap but are absent from the generated bitmap. The second earpiece may transmit information indicating at least one of the generated bitmap and/or the set of missing packets to the first earpiece. At operation 1906, the first earpiece may relay the missing baseband packets to the second earpiece. For example, the first earpiece may identify the missing packets based on the information received from the second earpiece. At 1908, the second earpiece may construct a PDU based on the relayed baseband packets. For example, the second earpiece may combine information received from one or more packets, and the second earpiece may provide the combined information to a higher layer.

Figure 20:
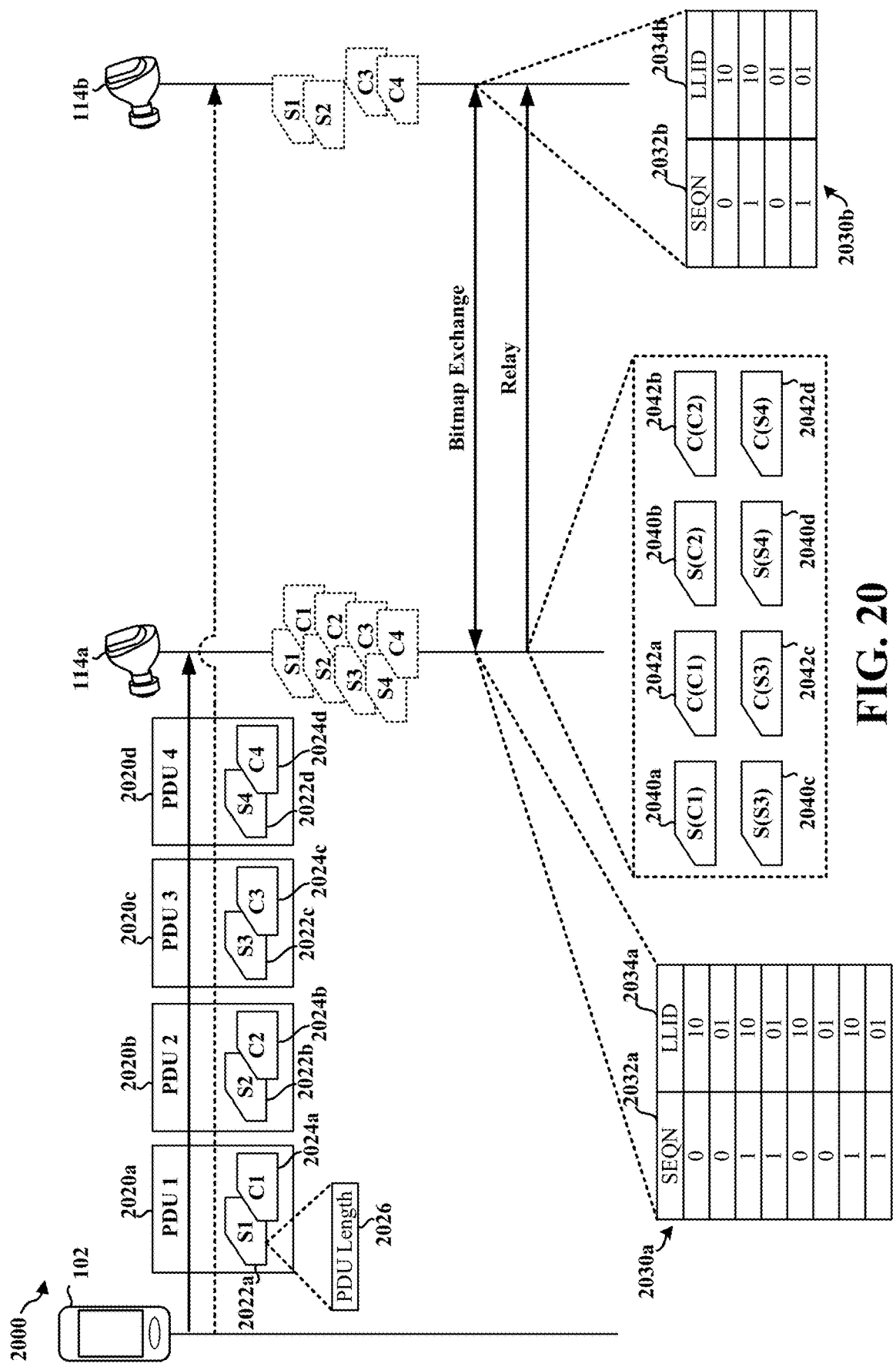
FIG. 20 is a diagram illustrating data flow in an example short-range wireless communications system.

FIG. 20 is a diagram illustrating a data flow between a source device 102 and a headset 112 that includes a primary earpiece 114a and a secondary earpiece 114b. The source device 102 may transmit a set of PDUs 2020a-d (e.g., L2CAP PDUs) to the primary earpiece 114a over the communications link 116. To do so, however, the source device 102 may divide each of the PDUs 2020a-d into a respective set of fragments (also referred to as baseband packets). Each of the PDUs 2020a-d may include a respective one of the start fragments S1-S4 2022a-d and a respective one of the continue fragments C1-C4 2024a-d. In some aspects, the PDUs 2020a-d may be divided into more than two fragments and, therefore, a greater number of continue fragments may be used to transmit the PDUs 2020a-d.

The primary earpiece 114a may successfully receive each of the start fragments S1-S4 2022a-d and each of the continue fragments C1-C4 2024a-d and, therefore, may be able to construct each of the PDUs 2020a-d. In the context of FIG. 3A, for example, the primary earpiece 114a may construct the PDUs at a link controller 320, link manager 320, and/or L2CAP layer 314. In the context of FIG. 3B, for example, the primary earpiece 114a may construct the PDUs at a link layer 370 and/or L2CAP layer 368. The primary earpiece 114a may successfully receive a fragment when the fragment passes CRC validation and, if present, passes MIC validation.

The secondary earpiece 114b may be monitoring (or sniffing) on the communications link 116 for fragments transmitted to the primary earpiece 114a. Based on monitoring the communications link 116, the secondary earpiece 114b may receive a subset of the fragments. For example, the secondary earpiece 114b may successfully receive the start fragments S1-S2 2022a-b of the first and second PDUs 2020a-b and may successfully receive the continue fragments C3-C4 2024c-d of the third and fourth PDUs 2020c-d. The secondary earpiece 114b may successfully receive a fragment when the fragment passes CRC validation and, if present, passes MIC validation.

However, the secondary earpiece 114b may not successfully receive the continue fragments C1-C2 2024a-b of the first and second PDUs 2020a-b and may not successfully receive the start fragments S3-S4 2022c-d of the third and fourth PDUs 2020c-d. The secondary earpiece 114b may not successfully receive a fragment, for example, when the secondary earpiece 114b does not receive the fragment or the fragment fails CRC validation and/or, if present, fails MIC validation. As the secondary earpiece 114b may lack both start and continue fragments for each of the PDUs 2020a-d, the secondary earpiece 114b may be unable to construct any of the PDUs 2020a-d based on monitoring the communications link 116 without relay from the primary device 114a.

Based on receiving the fragments, each of the earpieces 114a-b may determine (e.g., generate a respective one of the bitmaps 2030a-b. As the primary earpiece 114a receives each of the start and continue fragments S1-S4, C1-C4 2022a-d, 2024a-d for each of the PDUs 2020a-d, the primary earpiece 114a may generate a first bitmap 2030a including information indicating a SEQN 2032a associated with each of the fragments S1-S4, C1-C4 2022a-d, 2024a-d and an LLID 2034a associated with each of the fragments S1-S4, C1-C4 2022a-d, 2024a-d. In some aspects, the SEQN 2032a may be the same for each of the fragments of the same PDU. In some further aspects, the LLID 2034a may indicate whether each of the fragments S1-S4, C1-C4 2022a-d, 2024a-d is a start fragment or a continue fragment. For example, an LLID of "10" may indicate a fragment is a start fragment, whereas an LLID of "01" may indicate a fragment is a continue fragment. The secondary earpiece 114b may receive a subset of the fragments and, therefore, may generate a second bitmap 2030b including information indicating an SEQN 2032b and an LLID 2034b for each of the successfully received fragments S1-S2, C3-C4 2022a-b, 2024c-d.

Subsequently, the primary earpiece 114a may transmit the first bitmap 2030a to the secondary earpiece 114b. In some aspects, the primary earpiece 114a may transmit additional information associated with the first bitmap 2030a to the secondary earpiece 114b (e.g., in the same message as the first bitmap 2030a or in a different message(s)). The additional information may include one or more of a bitmap stream of the first bitmap 2030a, a clock value associated with the first bitmap 2030a, and/or a value of the packet counter corresponding to a first packet associated with the first bitmap 2030a (e.g., when the communications link 116 is an AES-CCM encrypted link).

According to some aspects, the secondary earpiece 114b may determine the fragments that were not successfully received by the secondary earpiece 114b based on the first bitmap 2030a and/or based on the second bitmap 2030b (e.g., as described with respect to one or more of FIGS. 6-7, 9, 10, and 14-18, supra). For example, the secondary earpiece 114b may compare the first and second bitmaps 2030a-b in order to determine which fragments are indicated as received in the first bitmap 2030a, but are absent from the second bitmap 2030b. As illustrated, the secondary earpiece 114b may determine that the secondary earpiece 114b has not successfully received the first two continue fragments C1-C2 2024a-b and, further, has not successfully received the second two start fragments S3-S4 2022c-d.

In an example configuration, the secondary earpiece 114b may begin processing the first start fragment S1 2022a, such as when the secondary earpiece 114b determines that the secondary earpiece 114b has not successfully received the first continue fragment C1 2024a. For example, the controller 306/356 of the secondary earpiece 114b may provide the first start fragment S1 2022a to the host 304/354. Further, the secondary earpiece 114b (e.g., the controller 306/356) may determine the length of the missing first continue fragment C1 2024a based on the length 2026 of the first PDU 2020a, which may be carried in the header of the first start fragment S1 2022a. For example, the secondary earpiece 114b may subtract the length of the successfully received first start fragment S1 2022a from the length 2026 of the first PDU 2020a indicated in the header of the first start fragment S1 2022a.

The secondary earpiece 114b may transmit, to the primary earpiece 114a, information indicating the fragments that were unsuccessfully received by the secondary earpiece 114b. In some aspects, the information may identify the unsuccessfully received fragments—e.g., the information may be a list including information identifying each of the unsuccessfully received fragments. In some other aspects, the secondary earpiece 114b may transmit the second bitmap 2030b to the primary earpiece 114a, which may indicate the unsuccessfully received fragments to the primary earpiece 114a.

In some aspects, the secondary earpiece 114b may transmit additional information associated with the second bitmap 2030b to the primary earpiece 114a (e.g., in the same message as the second bitmap 2030b or in a different message(s)). The additional information may include one or more of a bitmap stream of the second bitmap 2030b, a clock value associated with the second bitmap 2030b, and/or a value of the packet counter corresponding to a first packet associated with the second bitmap 2030b (e.g., when the communications link 116 is an AES-CCM encrypted link).

The primary earpiece 114a may receive the information indicating the fragments unsuccessfully received by the secondary earpiece 114b. Further, the primary earpiece 114a may determine the fragments unsuccessfully received by the secondary earpiece 114b. In one example, the primary earpiece 114a may determine the unsuccessfully received fragments based on information identifying each of the fragments that were unsuccessfully received by the secondary earpiece 114b (e.g., a list received from the secondary earpiece 114b that includes information identifying each of the unsuccessfully received fragments), which may have been received by the primary earpiece 114a based on the first bitmap 2030a transmitted to the secondary earpiece 114b. In another example, the primary earpiece 114a may determine the unsuccessfully received fragments based on the first bitmap 2030a and the second bitmap 2030b (e.g., as described with respect to one or more of FIGS. 6-7, 9, 10, and 14-18, supra). For example, the primary earpiece 114a may compare the first and second bitmaps 2030a-b in order to determine which fragments are indicated as received in the first bitmap 2030a, but are absent from the second bitmap 2030b. As illustrated, the primary earpiece 114a may determine that the secondary earpiece 114b has not successfully received the first two continue fragments C1-C2 2024a-b and, further, has not successfully received the second two start fragments S3-S4 2022c-d.

When the primary earpiece 114a determines the fragments unsuccessfully received by the secondary earpiece 114a, the primary earpiece 114a may relay each of the unsuccessfully received fragments to the secondary earpiece 114a. To do so, the primary earpiece 114a may divide each of the unsuccessfully received fragments into two or more fragments (or baseband packets). For example, the primary earpiece 114a may divide the unsuccessfully received first continue fragment C1 2024a into a first relay start fragment S(C1) 2040a and a first relay continue fragment C(C1) 2042a, the unsuccessfully received second continue fragment C2 2024b into a second relay start fragment S(C2) 2040b and a second relay continue fragment C(C2) 2042b, the unsuccessfully received third start fragment C3 2022c into a third relay start fragment S(S3) 2040c and a third relay continue fragment C(S3) 2042c, and the unsuccessfully received fourth start fragment S4 2022d into a fourth relay start fragment S(S4) 2040d and a fourth relay continue fragment C(S4) 2042d. The primary earpiece 114a may then transmit the relay fragments 2040a-d, 2042a-d to the secondary earpiece 114b over the short-range communications link 118. Potentially, the primary earpiece 114 may sequentially transmit the relay fragments 2040a-d, 2042a-d, such that the secondary earpiece 114b sequentially receives the relay fragments 2040a-d, 2042a-d.

The secondary earpiece 114b may correspondingly receive the relay fragments 2040a-d, 2042a-d from the primary earpiece 114a over the short-range communications link 118. When the secondary earpiece 114b receives the fragment S(C1) 2040a over the short-range communications link 118, the secondary earpiece 114b may determine that the fragment S(C1) 2040a is a start fragment corresponding to the unsuccessfully received continue fragment C1 2024a, for example, based on the length of the continue fragment C1 2024a. In some aspects, the controller 306/356 of the secondary earpiece 114b may provide the fragment S(C1) 2040a to the host 304/354 while reception of the remaining continue fragments to complete the fragment C1 2024a is pending.

The secondary earpiece 114b may then receive the continue fragment C(C1) 2042a corresponding to the unsuccessfully received first continue fragment C1 2024a. Upon reception, the controller 306/356 of the secondary earpiece 114b may provide the fragment C(C1) 2042a to the host 304/354, which may construct the first PDU 2020a from the received fragments determined to correspond to the first PDU 2020a.

Similarly, the secondary earpiece 114b may receive the fragment S(C2) 2040b over the short-range communications link 118, and the secondary earpiece 114b may determine that the fragment S(C2) 2040b is a start fragment corresponding to the unsuccessfully received continue fragment C2 2024b, for example, based on the length of the continue fragment C2 2024b. The controller 306/356 of the secondary earpiece 114b may provide the fragment S(C2) 2040b to the host 304/354 while reception of the remaining continue fragments to complete the fragment C2 2024b is pending. Next, the secondary earpiece 114b may receive the continue fragment C(C2) 2042b corresponding to the unsuccessfully received second continue fragment C2 2024b, and the controller 306/356 may provide the fragment C(C2) 2042*b* to the host 304/354 in order to construct the second PDU 2020*b* from the received fragments determined to correspond to the second PDU 2020*b*.

Subsequently, the secondary earpiece 114*b* may receive the third relay start fragment S(S3) 2040*c*, which the controller 306/356 may provide to the host 304/354 while reception of the remaining continuation fragment(s) is pending. According to some configurations, the secondary earpiece 114*b* may determine the length of the third PDU 2020*c* based on information carried in the header of the relay start fragment S(S3) 2040*c*, and therefore, the secondary earpiece 114*b* may determine the length of the unsuccessfully received third start fragment S3 2022*c* because the secondary earpiece 114*b* has successfully received the third continuation fragment C3 2024*c* from which its own length can be determined. The secondary earpiece 114*b* may then receive the relay continue fragment C(S3) 2042*c*, which the controller 306/356 may provide to the host 304/354 in order to construct the third PDU 2020*c*.

As the primary earpiece 114*a* may sequentially transmit fragments, the secondary earpiece 114*b* may successively receive the fourth relay start fragment S(S4) 2040*d*, and the controller 306/356 may provide to the same to the host 304/354. The secondary earpiece 114*b* may then receive the relay continue fragment C(S4) 2042*d* completing the fourth PDU 2020*d*. The controller 306/356 of the secondary earpiece 114*b* may provide to the relay continue fragment C(S4) 2042*d* to the host 304/354, which may construct the fourth PDU 2020*d* and thus complete construction of the sequence of PDUs 2020*a*-*d* transmitted by the source device 102.

In another configuration, the secondary earpiece 114*b* may avoid determining the lengths of PDUs from the headers of start fragments corresponding to those PDUs. In one configuration, the bitmaps 2030*a*-*b* may be extended to indicate two values in addition to "start" and "end"—for example, for each fragment, the bitmaps 2030*a*-*b* may be configured to additionally indicate "start-end" and "continue-end." Specifically, the LLID field may be used to indicate one of "start," "continue," "start-end," and "continue-end" for each successfully received fragment. In other words, the LLID field of the bitmaps 2030*a*-*b* may be used to convey information indicating the end of a relay of a missing fragment (e.g., a fragment relayed by the primary earpiece 114*a* over the short-range communications link 118). This extension of the LLID field may facilitate relay over a separate LT-ADDR or another configuration separating one communications link (e.g., the communications link 116) from a short-range communications link between earpieces (e.g., the short-range communications link 118).

In a further configuration, the first bitmap 2030*a* transmitted by the primary earpiece 114*a* may additionally indicate information associated with the L2CAP header (e.g., CID and length) of each L2CAP start fragment which is marked by the primary earpiece 114*a* in the first bitmap 2030*a*. This additionally indicated information may inform the secondary earpiece 114*b* about L2CAP fragments that may have been flushed or otherwise unable to be relayed. Accordingly, the secondary earpiece 114*b* may obtain information about the number of packets corresponding to a particular CID (A2DP), which may have otherwise not been indicated in the first bitmap 2030*a*. Based on the information about fragments that were missed by and/or not relayed to the secondary earpiece 114*b*, the secondary earpiece 114*b* may determine an amount of data (e.g., audio data of an audio stream) that was missed and may accordingly adjust the TTP corresponding to future packets.

Figure 21:
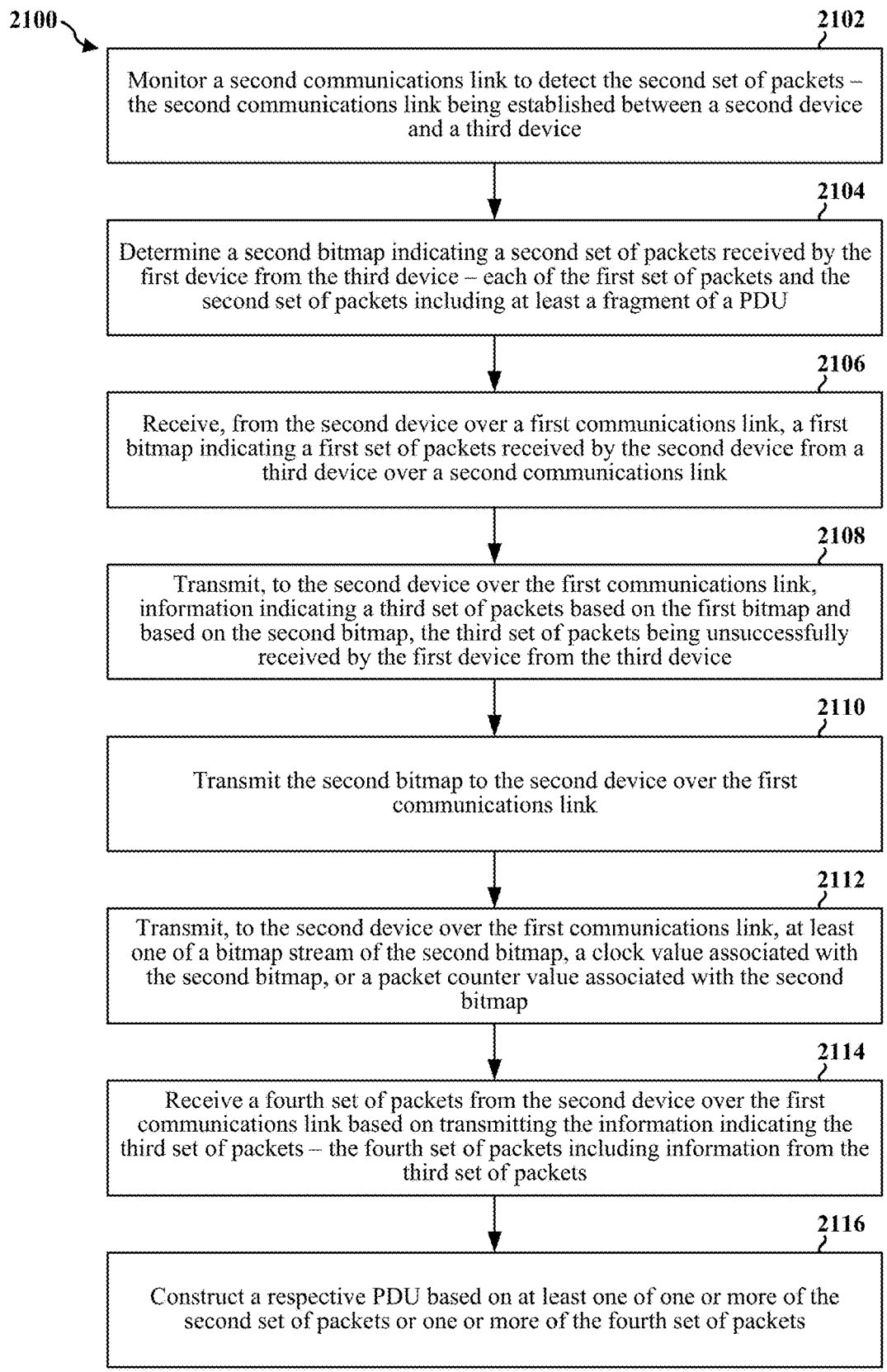
FIG. 21 is a flowchart of one example method of short-range wireless communication.

FIG. 21 is a flowchart illustrating a method 2100 of wireless communication by a first device. For example, the first device may be a secondary earpiece, such as the secondary earpiece 114*b*. In some configurations, the wireless device 200 of FIG. 2 may perform the method 2100. In some other configurations, the method 2100 may be performed by a first device implementing the protocol stack 300 of FIG. 3A or the protocol stack 350 of FIG. 3B. According to various aspects, one or more operations of the method 2100 may be transposed, omitted, and/or contemporaneously performed.

At 2102, the first device may monitor a second communications link to detect a second set of packets. The first device may be configured to communicate with a second device over a first communications link, whereas the second communications link may be established between a second device and a third device. The first device may monitor the second communications link, for example, by determining resources configured between the second device and the third device and, next, sniffing packets on the determined resources to receive packets. For example, referring to FIG. 1, the secondary earpiece 114*b* may monitor the communications link 116 to detect the set of packets 120 transmitted by the source device 102 to the primary earpiece 114*a*.

At 2104, the first device may determine a second bitmap indicating a second set of packets received by the first device from the third device. In various aspects, each of the second set of packets may include at least a fragment (or baseband packet) of a PDU. For example, the first device may receive each of the second set of packets and, next, the first device may mark an SEQN in the second bitmap for each of the second set of packets that is successfully received and may mark an LLID in the second bitmap for each of the second set of packets that is successfully received. For example, referring to FIG. 20, the secondary earpiece 114*b* may determine the second bitmap 2030*b* indicating the fragments S1-S2, C3-C4 2022*a*-*b*, 2024*c*-*d* received by the secondary earpiece 114*b* from the source device 102.

At 2106, the first device may receive, from the second device over the first communications link, a first bitmap indicating a first set of packets received by the second device from the third device over the second communications link. In some aspects, the first bitmap indicates a respective LLID for each of the first set of packets received by the second device. For example, referring to FIG. 20, the secondary earpiece 114*b* may receive, from the primary earpiece 114*a* over the short-range communications link 118, the first bitmap 2030*a* indicating the fragments S1-S4, C1-C4 2022*a*-*d*, 2024*a*-*d* received by the primary earpiece 114*a* from the source device 102 over the communications link 116.

At 2108, the first device may transmit, to the second device over the first communications link, information indicating a third set of packets based on the first bitmap and based on the second bitmap. The third set of packets may be those packets transmitted by the third device, but unsuccessfully received by the first device. In some aspects, the information indicating the third set of packets may be based on one or more LLIDs corresponding to one or more of the first set of packets and/or one or more LLIDs corresponding to one or more of the second set of packets. For example, referring to FIG. 20, the secondary earpiece 114*b* may transmit, to the primary earpiece 114*a* over the short-range communications link 118, information indicating the fragments S3-S4, C1-C2 2022*c*-*d*, 2024*a*-*b* unsuccessfully received by the secondary earpiece 114b based on the first bitmap 2030a and based on the second bitmap 2030b.

At 2110, the first device may transmit the second bitmap to the second device over the first communications link. In some aspects, the second bitmap may be the information indicating the third set of packets (e.g., 2108 and 2110 may be combined). In some aspects, the second bitmap indicates a respective LLID for each of the second set of packets received by the first device. For example, referring to FIG. 20, the secondary earpiece 114b may transmit, to the primary earpiece 114a over the short-range communications link 118, the second bitmap 2030b indicating the fragments S1-S2, C3-C4 2022a-b, 2024c-d successfully received by the secondary earpiece 114b from the source device 102.

At 2112, the first device may transmit, to the second device over the first communications link, at least one of a bitmap stream of the second bitmap, a clock value associated with the second bitmap, and/or a packet counter value associated with the second bitmap. For example, referring to FIG. 20, the secondary earpiece 114b may transmit, to the primary earpiece 114a over the short-range communications link 118, at least one of a bitmap stream of the second bitmap 2030b, a clock value associated with the second bitmap 2030b, and/or a packet counter value associated with the second bitmap 2030b.

At 2114, the first device may receive a fourth set of packets from the second device over the first communications link based on transmitting the information indicating the third set of packets. The fourth set of packets may include information from the third set of packets—for example, each of the fourth set of packets may be a relay of at least a portion of a corresponding one of the third set of packets. In some aspects, each of the fourth set of packets may be one of a start fragment or continue fragment relaying one of the third set of packets. For example, referring to FIG. 20, the secondary earpiece 114b may receive, from the primary earpiece 114a over the short-range communications link 118, the fragments S(C1), C(C1), S(C2), C(C2), S(S3), C(S3), S(S4), C(S4) 2040a-d, 2042a-d, which may correspond to a respective one of the fragments S3-S4, C1-C2 2022c-d, 2024a-b unsuccessfully received by the secondary earpiece 114b.

At 2116, the first device may construct a respective PDU based on at least one of one or more of the second set of packets and/or one or more of the fourth set of packets. Each of the second set of packets and each of the fourth set of packets may be a fragment corresponding to a respective PDU. In some aspects, the first device may identify each of the start and one or more continue fragments corresponding to a respective PDU and, next, the first device may combine information from the corresponding start and one or more continue fragments to recover the respective PDU. In some aspects, the respective PDU may be constructed based on a first length of the respective PDU and at least one second length of the at least one of one or more of the second set of packets and/or one or more of the fourth set of packets. For example, referring to FIG. 20, the secondary earpiece 114b may construct each of the PDUs 2020a-d based on the set of fragments S1-S2, C3-C4 2022a-b, 2024c-d successfully received by the secondary earpiece 114b from the source device 102 and based on the fragments S(C1), C(C1), S(C2), C(C2), S(S3), C(S3), S(S4), C(S4) 2040a-d, 2042a-d successfully received by the secondary earpiece 114b from the primary earpiece 114a.

Figure 22:
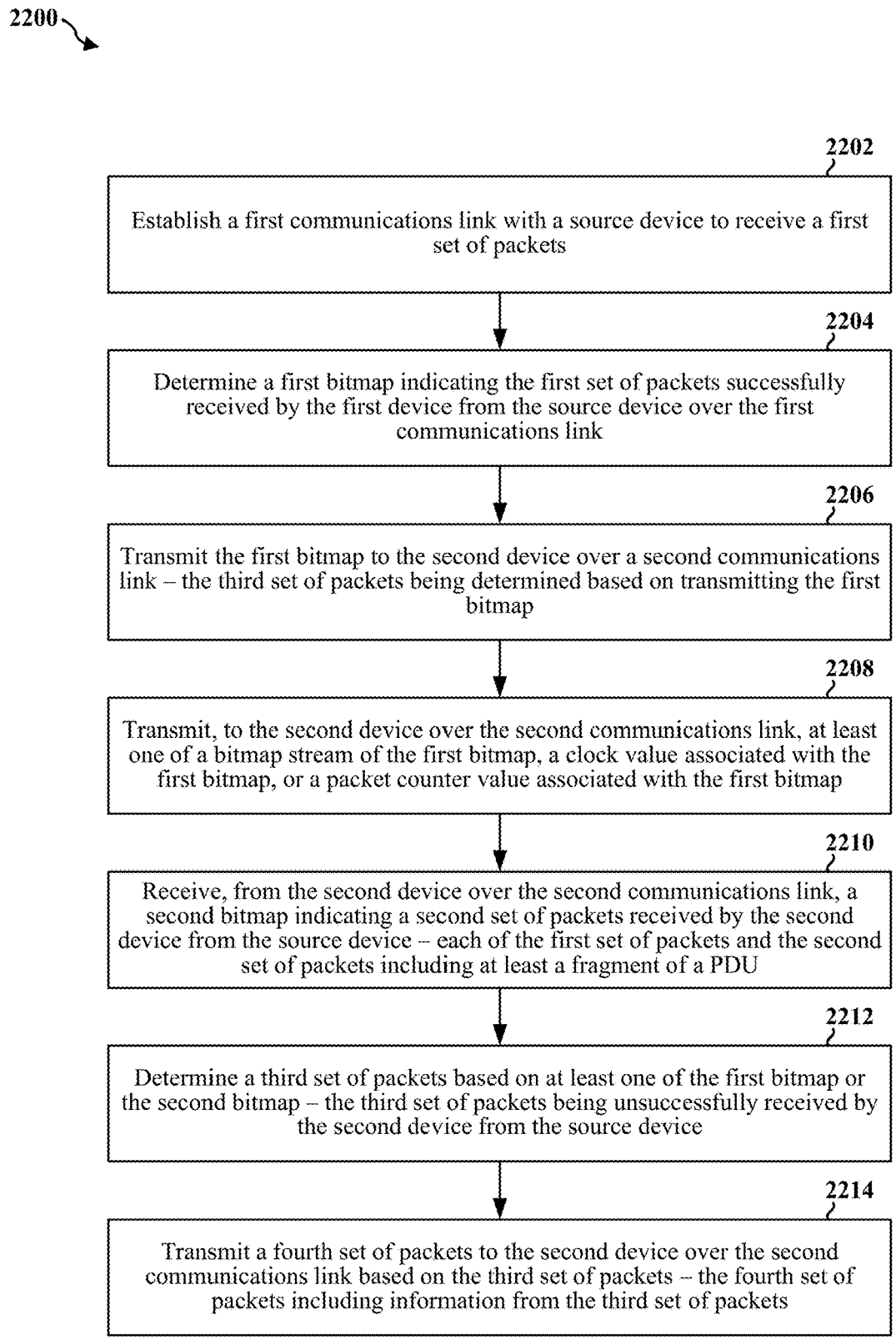
FIG. 22 is a flowchart of another example method of short-range wireless communication.

FIG. 22 is a flowchart illustrating a method 2200 of wireless communication by a first device. For example, the first device may be a primary earpiece, such as the primary earpiece 114a. In some configurations, the wireless device 200 of FIG. 2 may perform the method 2200. In some other configurations, the method 2200 may be performed by a first device implementing the protocol stack 300 of FIG. 3A or the protocol stack 350 of FIG. 3B. According to various aspects, one or more operations of the method 2200 may be transposed, omitted, and/or contemporaneously performed.

At 2202, the first device may establish a first communications link to receive a first set of packets from a source device. The first device may be associated with a second device, which may be configured to passively monitor the first communications link to receive a second set of packets. The first device may be configured to communicate with the second device over a second communications link, such as a short-range communications link. The first device may establish the first communications link, for example, by associating with the source device and, next, determining resources configured between the first device and the source device. For example, referring to FIG. 1, the primary earpiece 114a may establish the communications link 116 with the source device 102 to receive the set of packets 120 transmitted by the source device 102 to the primary earpiece 114a.

At 2204, the first device may determine a first bitmap indicating the first set of packets received by the first device from the third device over the first communications link. In various aspects, each of the first set of packets may include at least a fragment (or baseband packet) of a PDU. For example, the first device may receive each of the first set of packets and, next, the first device may mark an SEQN in the first bitmap for each of the first set of packets that is successfully received and may mark an LLID in the first bitmap for each of the first set of packets that is successfully received. For example, referring to FIG. 20, the primary earpiece 114a may determine the first bitmap 2030a indicating the fragments S1-S4, C1-C4 2022a-d, 2024a-d received by the primary earpiece 114a from the source device 102 over the communications link 116.

At 2206, the first device may transmit, to the second device over the second communications link, the first bitmap indicating the first set of packets received by the first device from the third device over the first communications link. For example, referring to FIG. 20, the primary earpiece 114a may transmit, to the secondary earpiece 114b over the short-range communications link 118, the first bitmap 2030a indicating the fragments S1-S4, C1-C4 2022a-d, 2024a-d successfully received by the primary earpiece 114a from the source device 102 over the communications link 116.

At 2208, the first device may transmit, to the second device over the second communications link, at least one of a bitmap stream of the first bitmap, a clock value associated with the first bitmap, and/or a packet counter value associated with the first bitmap. For example, referring to FIG. 20, the primary earpiece 114a may transmit, to the secondary earpiece 114b over the short-range communications link 118, at least one of a bitmap stream of the first bitmap 2030a, a clock value associated with the first bitmap 2030a, and/or a packet counter value associated with the first bitmap 2030a.

At 2210, the first device may receive, from the second device over the second communications link, a second bitmap indicating a second set of packets successfully received by the second device from the source device. In some aspects, the second bitmap indicates a respective LLID for each of the second set of packets received by the second device. In some aspects, the second bitmap may indicate a set of packets transmitted by the source device but unsuccessfully received by the second device. For example, referring to FIG. 20, the primary earpiece 114a may receive, from the secondary earpiece 114b over the short-range communications link 118, the second bitmap 2030b indicating the fragments S1-S2, C3-C4 2022a-b, 2024c-d successfully received by the secondary earpiece 114b from the source device 102.

At 2212, the first device may determine a third set of packets based on at least one of the first bitmap and/or the second bitmap. The third set of packets may be those packets transmitted by the source device, but unsuccessfully received by the second device. For example, the first device may compare entries of the first bitmap with entries of the second bitmap and, next, the first device may identify packets having associated entries in the first bitmap but not having associated entries in the second bitmap, which may indicate packets unsuccessfully received by the second device. In some further aspects, the first device may determine the third set of packets based on one or more LLIDs of the first bitmap corresponding to one or more of the first set of packets and/or one or more LLIDs of the second bitmap corresponding to one or more of the second set of packets. For example, referring to FIG. 20, the primary earpiece 114a may determine that the fragments S3-S4, C1-C2 2022c-d, 2024a-b were unsuccessfully received by the secondary earpiece 114b based on at least one of the first bitmap 2030a and/or the second bitmap 2030b.

At 2214, the first device may transmit a fourth set of packets to the second device over the second communications link. The fourth set of packets may include information from the third set of packets—for example, each of the fourth set of packets may be a relay of at least a portion of a corresponding one of the third set of packets. In some aspects, each of the fourth set of packets may be one of a start fragment or continue fragment relaying one of the third set of packets. For example, referring to FIG. 20, the primary earpiece 114a may transmit, to the secondary earpiece 114b over the short-range communications link 118, the fragments S(C1), C(C1), S(C2), C(C2), S(S3), C(S3), S(S4), C(S4) 2040a-d, 2042a-d, which may correspond to a respective one of the fragments S3-S4, C1-C2 2022c-d, 2024a-b unsuccessfully received by the secondary earpiece 114b.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a first device, the method comprising:
    receiving, from a second device over a first communications link, a first bitmap indicating a first set of packets received by the second device from a third device over a second communications link;
    determining a second bitmap indicating a second set of packets received by the first device from the third device, each of the first set of packets and the second set of packets comprising at least a fragment of a protocol data unit (PDU);
    transmitting, to the second device over the first communications link, information indicating a third set of packets based on the first bitmap and based on the second bitmap, the third set of packets being unsuccessfully received by the first device from the third device; and
    receiving a fourth set of packets from the second device over the first communications link based on transmitting the information indicating the third set of packets, the fourth set of packets including information from the third set of packets,
    wherein, when the PDU at the first device is fragmented, the second device obtains payloads of baseband fragments of the PDU and includes in the first bitmap information indicating, for each of the fragments, the payloads and fragment start values to enable the first device to reconstruct the PDU.

2. The method of claim 1, further comprising:
    transmitting the second bitmap to the second device over the first communications link.

3. The method of claim 2, further comprising:
    transmitting, to the second device over the first communications link, at least one of a bitmap stream of the second bitmap, a clock value associated with the second bitmap, or a packet counter value associated with the second bitmap.

4. The method of claim 2, wherein the information indicating the third set of packets comprises the second bitmap.

5. The method of claim 2, wherein the second bitmap is transmitted to the second device before receiving the fourth set of packets.

6. The method of claim 1, further comprising:
constructing a respective PDU based on at least one of one or more of the second set of packets or one or more of the fourth set of packets,
wherein the at least one of the one or more of the second set of packets or the one or more of the fourth set of packets comprise at least one fragment of the respective PDU.

7. The method of claim 6, wherein the respective PDU is constructed based on a first length of the respective PDU and at least one second length of the at least one of the one or more of the second set of packets or the one or more of the fourth set of packets.

8. The method of claim 1, wherein the first bitmap indicates a respective first logical link identifier (LLID) for each of the first set of packets and the second bitmap indicates a respective second LLID for each of the second set of packets, and wherein the information indicating the third set of packets is based on at least one of one or more first LLIDs or one or more second LLIDs.

9. The method of claim 1, further comprising:
monitoring the second communications link to detect the second set of packets,
wherein the second communications link is established between the second device and the third device.

10. An apparatus for wireless communication by a first device, the apparatus comprising:
a memory; and
at least one processor communicatively connected to the memory and configured to:
receive, from a second device over a first communications link, a first bitmap indicating a first set of packets received by the second device from a third device over a second communications link;
determine a second bitmap indicating a second set of packets received by the first device from the third device, each of the first set of packets and the second set of packets comprising at least a fragment of a protocol data unit (PDU);
transmit, to the second device over the first communications link, information indicating a third set of packets based on the first bitmap and based on the second bitmap, the third set of packets being unsuccessfully received by the first device from the third device; and
receive a fourth set of packets from the second device over the first communications link based on transmission of the information indicating the third set of packets, the fourth set of packets including information from the third set of packets,
wherein, when the at least one processor determines that the PDU is fragmented, the second device is configured to obtain payloads of baseband fragments of the PDU and to include in the first bitmap information indicating, for each of the fragments, the payloads and fragment start values to enable the first device to reconstruct the PDU.

11. The apparatus of claim 10, wherein the at least one processor is further configured to:
transmit the second bitmap to the second device over the first communications link.

12. The apparatus of claim 11, wherein the at least one processor is further configured to:
transmit, to the second device over the first communications link, at least one of a bitmap stream of the second bitmap, a clock value associated with the second bitmap, or a packet counter value associated with the second bitmap.

13. The apparatus of claim 11, wherein the information indicating the third set of packets comprises the second bitmap.

14. The apparatus of claim 11, wherein the second bitmap is transmitted to the second device before receiving the fourth set of packets.

15. The apparatus of claim 10, wherein the at least one processor is further configured to:
construct a respective PDU based on at least one of one or more of the second set of packets or one or more of the fourth set of packets,
wherein the at least one of the one or more of the second set of packets or the one or more of the fourth set of packets comprise at least one fragment of the respective PDU.

16. The apparatus of claim 15, wherein the respective PDU is constructed based on a first length of the respective PDU and at least one second length of the at least one of the one or more of the second set of packets or the one or more of the fourth set of packets.

17. The apparatus of claim 10, wherein the first bitmap indicates a respective first logical link identifier (LLID) for each of the first set of packets and the second bitmap indicates a respective second LLID for each of the second set of packets, and wherein the information indicating the third set of packets is based on at least one of one or more first LLIDs or one or more second LLIDs.

18. An apparatus for wireless communication by a first device, the apparatus comprising:
means for receiving, from a second device over a first communications link, a first bitmap indicating a first set of packets received by the second device from a third device over a second communications link;
means for determining a second bitmap indicating a second set of packets received by the first device from the third device, each of the first set of packets and the second set of packets comprising at least a fragment of a protocol data unit (PDU);
means for transmitting, to the second device over the first communications link, information indicating a third set of packets based on the first bitmap and based on the second bitmap, the third set of packets being unsuccessfully received by the first device from the third device; and
means for receiving a fourth set of packets from the second device over the first communications link based on transmitting the information indicating the third set of packets, the fourth set of packets including information from the third set of packets,
wherein, when the PDU at the first device is fragmented, the second device obtains payloads of baseband fragments of the PDU and includes in the first bitmap information indicating, for each of the fragments, the payloads and fragment start values to enable the first device to reconstruct the PDU.

19. The apparatus of claim 18, further comprising:
means for transmitting the second bitmap to the second device over the first communications link.

20. The apparatus of claim 19, further comprising:
means for transmitting, to the second device over the first communications link, at least one of a bitmap stream of the second bitmap, a clock value associated with the second bitmap, or a packet counter value associated with the second bitmap.

21. The apparatus of claim 19, wherein the information indicating the third set of packets comprises the second bitmap.

22. The apparatus of claim 19, wherein the second bitmap is transmitted to the second device before receiving the fourth set of packets.

23. The apparatus of claim 18, further comprising:
means for constructing a respective PDU based on at least one of one or more of the second set of packets or one or more of the fourth set of packets,
wherein the at least one of the one or more of the second set of packets or the one or more of the fourth set of packets comprise at least one fragment of the respective PDU.

24. The apparatus of claim 23, wherein the respective PDU is constructed based on a first length of the respective PDU and at least one second length of the at least one of the one or more of the second set of packets or the one or more of the fourth set of packets.

25. The apparatus of claim 18, wherein the first bitmap indicates a respective first logical link identifier (LLID) for each of the first set of packets and the second bitmap indicates a respective second LLID for each of the second set of packets, and wherein the information indicating the third set of packets is based on at least one of one or more first LLIDs or one or more second LLIDs.

26. A non-transitory, computer-readable medium storing computer-executable code for wireless communication by a first device, the code, when executed by a processor, to cause the processor to:

receive, from a second device over a first communications link, a first bitmap indicating a first set of packets received by the second device from a third device over a second communications link;

determine a second bitmap indicating a second set of packets received by the first device from the third device, each of the first set of packets and the second set of packets comprising at least a fragment of a protocol data unit (PDU);

transmit, to the second device over the first communications link, information indicating a third set of packets based on the first bitmap and based on the second bitmap, the third set of packets being unsuccessfully received by the first device from the third device; and receive a fourth set of packets from the second device over the first communications link based on transmission of the information indicating the third set of packets, the fourth set of packets including information from the third set of packets, wherein, when the PDU at the first device is fragmented, the second device obtains payloads of baseband fragments of the PDU and includes in the first bitmap information indicating, for each of the fragments, the payloads and fragment start values to enable the first device to reconstruct the PDU.

\* \* \* \* \*